(12) United States Patent
Sundar

(10) Patent No.: US 12,163,090 B1
(45) Date of Patent: *Dec. 10, 2024

(54) MAGNETIC NANOFLUID TEMPERATURE CONTROL

(71) Applicant: Prince Mohammad Bin Fahd University, Dhahran (SA)

(72) Inventor: Syam Sundar, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/614,658

(22) Filed: Mar. 23, 2024

Related U.S. Application Data

(63) Continuation of application No. 18/613,236, filed on Mar. 22, 2024.

(51) Int. Cl.
| | |
|---|---|
| *C09K 5/10* | (2006.01) |
| *B82Y 25/00* | (2011.01) |
| *H01F 1/44* | (2006.01) |

(52) U.S. Cl.
CPC .............. *C09K 5/10* (2013.01); *B82Y 25/00* (2013.01); *H01F 1/445* (2013.01)

(58) Field of Classification Search
CPC ... C09K 5/00; C09K 5/08; C09K 5/10; C09K 5/20; H01F 1/44; H01F 1/442; H01F 1/445; H01F 1/447; B82Y 25/00
See application file for complete search history.

(56) References Cited

U.S. PATENT DOCUMENTS

| | | | | |
|---|---|---|---|---|
| 10,030,186 | B2 * | 7/2018 | Chan ...................... | C09K 5/10 |
| 2008/0023666 | A1 * | 1/2008 | Gurin ..................... | C09K 5/00 |
| | | | | 252/74 |
| 2019/0214173 | A1 * | 7/2019 | Ramanujan ............ | H01F 1/445 |
| 2022/0332999 | A1 * | 10/2022 | Masada .................. | C09K 5/10 |

FOREIGN PATENT DOCUMENTS

| | | | |
|---|---|---|---|
| CN | 101726212 | A | 6/2010 |
| CN | 105006329 | A * | 10/2015 |
| CN | 105174212 | A | 12/2015 |
| CN | 116045586 | A * | 5/2023 |
| JP | 2009-64810 | | 3/2009 |
| KR | 2011059383 | A * | 6/2011 |
| RO | 126060 | A0 | 2/2011 |
| RU | 2644900 | C2 * | 2/2018 |

OTHER PUBLICATIONS

Ghofrani et al. ("Experimental investigation on laminar forced convection heat transfer of ferrofluids under an alternating magnetic field", Experimental Thermal and Fluid Science, 49, 2013, 193-200) (Year: 2013).*
Amani et al. ("Thermal conductivity measurement of spinel-type ferrite MnFe2O4 nanofluids in the presence of a uniform magnetic field", Journal of Molecular Liquids 230, 2017, 121-128) (Year: 2017).*
Arana et al. ("Thermomagnetic characterization of organic-based ferrofluids prepared with Ni ferrite nanoparticles", Materials Science and Engineering B, 215, 2017, 1-8) (Year: 2017).*
Gao et al. ("Anomalous Magnetoelectric Coupling Effect of CoFe2O4—BaTiO3 Binary Mixed Fluids", ACS Appl. Electron. Mater. 2019, 1, 1120-1132) (Year: 2019).*
Kharat et al. ("Preparation and thermophysical investigations of CoFe2O4-based nanofluid: a potential heat transfer agent", Journal of Superconductivity and Novel Magnetism, 32, 2019, 341-351) (Year: 2019).*
Gao et al. ("Effect of particle size of magnetodielectric and magnetoelectric coupling effect of CoFe2O4@BaTiO3 composite fluids", Journal of Materials Science: Materials in Electronics, 31, 2020, 9026-9036) (Year: 2020).*
Kuznetcov et al. ("Dielectric spectroscopy of nanofluids in deionized water: Method of removing electrode polarization effect", Colloids and Surfaces A: Physicochemical and Engineering Aspects 647, 2022, 129039) (Year: 2022).*
Flynn et al. ("Development of multiferroic CFO: BTO core-shell nanocomposite inks for inkjet printing", Ferroelectrics, 611, 2023, 205-211) (Year: 2023).*
Sundar et al. ("Influence of magnetic field location on the heat transfer and friction factor of CoFe2O4—BaTiO3/EG hybrid nanofluids in laminar flow: An experimental study", Journal of Magnetism and Magnetic Materials, 579, 2023, 170837) (Year: 2023).*
Nkurikiyimfura et al. ; Heat transfer enhancement by magnetic nanofluids—A review ; Renewable and Sustainable Energy Reviews 21 ; Dec. 26, 2012 ; 14 Pages.

* cited by examiner

*Primary Examiner* — Matthew R Diaz
(74) *Attorney, Agent, or Firm* — Oblon, McClelland, Maier & Neustadt, L.L.P.

(57) ABSTRACT

A magnetic nanofluid that includes magnetic transition metal ferrite nanoparticles, ferroelectric nanoparticles, and a carrier fluid, and a method of changing the temperature of an object (e.g., heating or cooling) using the magnetic nanofluid. The magnetic transition metal ferrite nanoparticles and ferroelectric nanoparticles can be present as a composite comprising both types of nanoparticles. The use of the magnetic nanofluid is associated with an increase in the Nusselt number in the presence of a magnetic field.

9 Claims, 16 Drawing Sheets

MAGNETIC NANOFLUID TEMPERATURE CONTROL

CROSS-REFERENCE TO RELATED APPLICATIONS

The present application is a Continuation of U.S. application Ser. No. 18/613,236, having a filing date of Mar. 22, 2024.

STATEMENT OF PRIOR DISCLOSURE BY AN INVENTOR

Aspects of the present disclosure are described in L. Syam Sundar and E. Venkata Ramana; "Influence of magnetic field location on the heat transfer and friction factor of $CoFe_2O_4$—$BaTiO_3$/EG hybrid nanofluids in laminar flow: An experimental study"; Journal of Magnetism and Magnetic Materials, 579, 2023, 170837, which is incorporated herein by reference in its entirety.

BACKGROUND OF THE INVENTION

Field of the Invention

The present disclosure relates to a magnetic nanofluid that includes magnetic transition metal ferrite nanoparticles, ferroelectric nanoparticles, and a carrier fluid, and a method of changing the temperature of an object (e.g., heating or cooling) using the magnetic nanofluid.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Nanofluids provide higher heat transfer rates compared to the single-phase fluids like water (W), ethylene glycol (EG), propylene glycol (PG), engine oil (EO), and others. Nanofluids can exhibit enhanced thermal conductivity compared to base fluids. Typically, nanofluids are prepared by dispersing nano-sized particles in a base fluid. Nanofluids have been used in cooling of electronic devices, solar energy systems, cooling of nuclear reactors, industrial applications such as heat exchangers, solar collectors, thermosyphon systems, heat pipes, and in microchannels for the increasing the performance of these systems.

Magnetic nanofluids, also known as ferrofluids, are the most often employed nanofluids across a variety of applications including magnetic sealing, dynamic loudspeakers, computer hardware, electronic packaging, aerospace, and bioengineering. Ferrofluids are also used in microfluidic pumps, valves, actuators, accelerometers, inclinometers, separation processes, catalytic reaction supports, pneumatic and hydraulic micro-actuators. Magnetic nanofluids also show promising optical applications based on the magneto-optic phenomenon, such as dichroism and birefringence. Superparamagnetic nanoparticles like $Fe_3O_4$, $Fe_2O_3$, Ni, and C0304 are diluted in single phase fluids to create these magnetic nanofluids.

Understanding the heat transfer properties of these magnetic nanofluids is critical for use in thermal devices. Magnetic nanofluids can have heat transfer properties that are sensitive to magnetic fields, necessitating the study of magnetic nanofluids both with and without applied magnetic fields. A solid understanding of the properties of magnetic nanofluids without applied fields is critical. For example, a Nusselt number (Nu) increase of 6.23% at $\phi=0.5$% vol. was observed for $Fe_3O_4$/water magnetic nanofluid at a Reynolds number (Re) of 2400 and with flux in heat of 160 W in a micro-fin heated tube [P. Naphon, S. Wuiyasart, Int. J. Heat Mass Transfer, 118, 2018, 297-303]. With the use of $Fe_3O4$/water nanofluids in a double pipe heat exchanger, a Nusselt number enhancement of 14.7% at 0.06% vol. and at a Reynolds number of 28954 was observed [N. T. R. Kumar, P. Bhrantara, L. S. Sundar, M. K. Singh, A. C. M. Sousa, Thermal Fluid Sci., 85, 2017, 331-343]. Heat transfer increases of 20.99% and 30.96% were found with the use of $\phi=0.6$% vol. of $Fe_3O4$/water nanofluid in a tube at a Reynolds number of 22000 [L. Syam Sundar, N,T, Ravi Kumar, M,T, Naik, K,V. Sharma, Int. J. Heat Mass Transfer, 55, 11-12, 2012, 2761-2768]. By using the Ni/water nanofluids, a Nusselt number augment of 39.18% at $\phi=0.6$% vol. and at a Reynolds number of 22000 has been observed [L.S. Sundar, M,K. Singh, I, Bidkin, A.C.M. Sousa, Int, J. Heat Mass Transfer, 70, 2014, 224-234]. A Nusselt number augment of 73.7% at 0.09% vol. was observed for water mixed $Fe_2O_3$ nanofluids [N.I. Zouli, S.A.M. Moltammed, M.H. AI-Dahhan, Tech Connect Briefs, 2017, 247-250]. An overall heat transfer enhancement of 3.44% and effectiveness enhancement of 3.26% at 0.06% vol. was shown for water dispersed $Fe_3O4$ nanofluids in a double pipe heat exchanger at a Reynolds number of 28984 [N.T.R. Kumar, L.S. Sundar, P. Bhrantara, Int. J. Dyn. Fluids, 12, 2016, 19-36]. Using the magnetic nanofluids its heat transfer is increased.

In addition, understanding of magnetic nanofluids requires investigation of the effect of an applied magnetic field. For example, a highest Nusselt number was observed by using 5% vol. of $F_3O4$/water nanofluid under laminar and turbulent by applying a magnetic field of 300 Gauss (G) [S. Mei, C. Qi, M, Liu, F. Fan, L. Uang, Int. J. Heat Mass Transfer, 134, 2019, 707-721]. Heat transfer enhancement of 10% and 13% of $Fe_3O4$/water nanofluids was found with and without magnetic field of 0.3 Telsa [D, GU7.ei, A. Mina.kov, M, Ptyazhnikov, K. Meshkov, S.V. Alelcseenko, MATEG Web Conf., 115, 2017, 07001]. A Nusselt number augment of 16.7% was observed for $Fe_3O4$/water nanofluids without magnetic field and also observed heat transfer and Nusselt number augment of 9.4%, 26.1%, 31.3% and 8.8%, 13.1%, and 23.9% with the magnetic field of 15.5, 30.3, and 45.5 mT compared to the base fluid without magnetic field [M,S. llhaid, A.M. Ghiair, M, Al-busoul, Adv. Mech. Eng., 2022, 14, 6]. Convection of ferrofluids was examined in an enclosed elliptic hot cylinder with an external magnetic source and an enhanced temperature gradient with respect to particle volume concentrations was observed [M. Sheikholeslami, R. lIllahi, K. Yafai, Alex. Eng, J., 57, 2, 2018, 565-575]. Heat transfer of $Fe_3O4$/water nanofluid was estimated with and without magnetic field and observed heat transfer increase of 13.5% compared to base fluid at a Reynolds number of 1200 without magnetic field and heat transfer increase of 31.4% with an applied magnetic field of 500 G [M. Goltarkbah, A. Salarian, M, Asbjaee, M. Shaltahadi, Powder Technol., 274, 2015, 258-267]. Five percent enhancement in heat transfer for 3% wt. of $Fe_3O4$/water nanofluid with the applied alternating magnetic field frequency of 50 Hz compared to without magnetic field was found [M. Ghadiri, 0. Haghani, E, llmam-jomeh, E, Barati, AUT J. Mech. Eng., 5, 3, 2021, 477-494]. Turbulent model of Re-normalization group (RNG) k-ε was used for the analysis of thermal boundary layer and particle motion of $Fe_3O_4$/water nanofluids. Heat transfer augment was observed to be small under a weak magnetic field and considerably higher for strong magnetic field [X. Zhang, Y, Zhang, Int. J. Thermal Sci., 163, 2021, 106826]. An external magnetic source effect on ferrofluid convection in an enclosure with elliptic hot cylinder was examiner and it was observed that the temperature gradient is an enhancing function of volume fraction of $Fe_3O4$ and Rayleigh number but it is a reduced as a function of Lorentz forces [M, Sheikholeslami, R. Ellahi, K. Yafai, Alex. Eng. J., 57, 2018, 565-575]. A maximum heat transfer augment of 4.62% for $Fe_3O_4$/water nanofluid by applying an alternating frequency of the magnetic field was observed [M, Dihaei, H, Kargarsharifahad, Int, J. Heat Mass Transfer Res., 4, 2017, 1-11]. The heat transfer of magnetic fluids is further augmented by applying the external magnetic field.

The Nusselt number, skin friction, and Sherwood number, velocity of micro-polar nanofluid between two parallel plates in the presence of magnetic and electric fields at different volume concentrations was investigated. At the weak concentration of 0.5 and strong concentration of 0, the Nusselt number was observed to be increased with an increase of Reynolds number [P, Jalili, H, Narimisa, B, Jalili, D,D, Ganji, Mod. Phys. Lett. B, 37, 2023, 2250197]. Numerical calculations and new semi-analytical methods were used to investigate the micro-polar nanofluid in a rotating system between two parallel plates with electric and magnetic fields and it was observed that this method offers a significant advantage and computational efficiency and accuracy [P, Jalili, H, Narimisa, B. Jalili, A, Shateri, D,D, Ganji, Soft. Comput., 27, 2, 2023, 677-689]. Runge Kutta and the semi-analytical techniques of the homotopy perturbation method (HPM) were used to solve the heat and mass transfer with effect of radiation parameter, magnetic field, Eckert number, Reynolds number, Schmidt number, and Prandtl number and obtained an enhanced Eckert number [P. Jalili, A.A. Azar, B. Jalili, Z. Asadi, D.D. Ganji, Case Stud. Thermal Eng., 40, 2022, 102524]. When Akbari-Ganji Method (AGM), Finite Element Method (FEM), and Runge-Kutta methods were used to analyze the thenal diffusivity of $Al2O_3$ and Cu hybrid nanofluids with effect of volume fraction and heat sources, it was observed that the AGM is more accurate than the FEM and Runge-Kutta methods [P. Jalili, A.S. Ghahare, B. Jalili, D.D. Ganji, SN, Article number: 95, Appl. Sci., 5, 2023].

The flow and thermic field characteristics of coherent Cu:γ-AlOOH/water hybrid nanofluid were analyzed in a microchannel heat sink and it was observed that with an increase of volume fractions decrease of temperature profiles [S.A. Abdollahi, P, Jalili, B, Jalili, H, Nourozpour, Y, Safari, P, Pasha, D,D, Ganji, Theor. Appl. Mech, Lett. 100432, 2023]. The heat transfer of water-aluminum oxide nanofluid and water-titanium dioxide nanofluids were estimated in a double-tube heat exchanger with various fins under the turbulent flow and it was found that nanofluids heat transfer coefficient increase of 12% for 6% vol. of nanofluid and also observed heat exchanger with a rectangular and curved fins have efficiency of 81% and 85% than heat exchanger without fin [B. Jalili, N, Aghaee, P, Jalili, D.D. Ganji, Case Stud. Thermal Eng., 35, 2022, 102086]. Analyzing transient squeezing flow of 2D Magneto hydrodynamics (MHD) considering Casson fluid in the presence of solar irradiance both numerically and theoretically, it was observed that with an increase of Pr number from 0.1 to 1.5, a decrease of Nusselt number from 1 to 0.01 and in squeezing parameter enhancement of 5% and 17% resulted [B. Jalili, A, Rezaeian, P, Jalili, D,D, Ganji, Y, Khan, J. Appl, Mathem. Mech., $202^3$]. Considering Akbari-Ganji Method (AGM) and Finite Element Method (FEM) for the analysis of MWCNT and SWCNT nanofluids between two porous disks in outer magnetic amplitude, a reduction in axial velocity with the increase of Reynolds number at any point in the space between the discs was observed [B. Jalili, H, Roshani, P, Jalili, M. Jalili, P, Pasha, D.D. Ganji, Case Stud. Thermal Eng., 45, 2023, 102961]. Analyzing the heat transfer of $Al_2O_3$/water nanofluid in a microchannel heat sink, it was found that implementing the magnetic field is direct connection with the Nusselt number [B. Jalili, A. Re:r.aeian, P, Jalili, F, Ommi, D,D, Ganji, Case Stud. Therm. Eng., 45, $202^3$, 102944].

Natural convection heat transfer rates of phase change materials in an open enclosure 15 under the parameters of Ra=$1.45\times10^8$<Ra<$1.97\times10^8$, 0.25<w/H<0.75 and 0.25<c/H<0.75 was analyzed and heat transfer coefficient was found to increase by 60% [H.F. Oztop, H. Cosanay, F. Selimelendigil, N. Abu-Hamdeh, Int. Comm. Heat and Mass Transfer, 137, 2022, 106240]. Numerical estimation of laminar natural convection heat transfer in cubical air-filled enclosures with partitions attached to the walls with different positions showed an increased heat transfer rates [N. Ugurlubilek, Z. Sert, F. Selimefendigil, H.F. Oztop, Int. Comm. Heat and Mass Transfer, 133, 2022, 105932]. Studies have been performed on the effects of magnetic field and packed bed phase change material (PCM) system in a 3D cavity having ventilation ports on the performance improvements of hybrid nanofluid convection. Considering the parameter range of Reynolds number from 250 to 750, Hartmann number from 0 to 100, size of the inlet from 0.15H to 0.85H and volume concentrations range from 0.02% to 0.1% an enhanced Nusselt number was found[F, Selimefendigil, H.F. Oztop, Int. J. Heat Mass Transfer, 183, 2022, 122233].

Unsteady Von-Karman flow of water-based nanofluid containing $Fe_3O4$ and Mn—$ZnFe_2O_4$ nanoparticles was considered over a rotating disk and it was observed that the thermal properties of $Fe_3O4$+water ferrofluid is more efficient than the Mn-$ZnFe_2O_4$+water ferrofluids [K. Sharma, N. Vijay, D. Bhardwaj, R. Jindal, J. Magnet. Magnetic Mater., 574, 2023, 170710]. Navier--Stokes equations supported by Shliomis theory were used for the estimation of hydrothermal aspects of flow of ferrofluid in disk and a heat transport enhancement of 19% when the disk moves upward with rotation and a 12% increment when the disk is stationary rotating was observed [K. Sharma, S. Kumar, J. Magnet. Magnetic Mater., 575, 2023, 170720]. Analyzing the ferrodynamic behavior of ferrofluids in rotating disk systems, an enhanced heat transfer rate with the increase of Reynolds number was found [N. Vijay, K. Sharma, Chinese J Physics, 78, 2022, 83-95]. Investigating the thermally radiative incompressible flow of hybrid nanofluid induced by a radially stretchable rotating disk with entropy generation, it was observed that the velocity distribution increases with an increase of entropy generation rate [N. Vijay, K. Sharma, Num. Heat Transfer, Part B: Fundam.: Int, J. Comput. Methodol. $202^3$]. The entropy optimization of Cu—$TiO_2$/water flow was analyzed over vertically moving rotating disk with thermal radiation and partial slip and it was found that the entropy rate rises with—radiation parameter, diffusion factor and temperature ratio parameter but it decreases with slip coefficient [S. Kumar, K. Sharma, Chinese J. Phys, 77, 2022, 861-873].

Hybrid magnetic nanofluids may exhibit higher heat transfer rates compared to mono nanofluids as well as the base fluids. Hybrid magnetic nanofluids are classified as the dispersion of hybrid magnetic nanoparticles into the base fluid. For example, a Nusselt number increase of 31.10% for $\phi=0.3\%$ vol. of MWCNT-$Fe_3O_4$ hybrid nanofluids under Reynolds number of 22000 [L.S. Sundar, M.K. Singh, A.C.M. Sousa, Int. Comm. Heat and Mass Transfer, 52, 2014, 73-83]. Pumping power and performance evaluation criterion increases of 9.71% and 19.60% were found in $Fe_3O4$-carbon nanotube/water hybrid nanofluid flow in a double-pipe mini-channel heat exchanger [A. Shaltsavar, A. Godini, P,T, Sardari, D. Toghraie, H, Salehipour, J. Thermal Anal. Calorim., 137, 3, 2019, 1031-104$^3$]. Nusselt number and pressure drop increases of 109.31% and 25.02% for 0.9:1.35% were observed for magnetite and CNT water hybrid nanofluid at a Reynolds number of 500 without magnetic field [J. Alsanaf, R. Rahmani, A. Shaltsavar, M, Afrand, S. Wongwises, M.D. Tran, J. Thermal Anal. Calorim., 137, 5, 2019, 1809-1825]. Graphene-magnetite hybrid nanofluids were investigated for total entropy generation. By using the hybrid nanofluids, the generation in entropy in total was decreased to 41% compared to water [M. Mehrali, E, Sadeghinezhad, A.R. Akhiani, S.T. Laltibari, H.S.C. Metselaar, A. S. Kherbeet, M. Mehrali, Powder Technol, 308, 2017, 149-157].

The transition metal ferrites ($MFe_2O_4$) are magnetic materials with a cubic spinel structure have been widely used for a variety of applications. For example, $CoFe_2O_4$ is mostly used in electronic packing, hyperthermia treatment, magnetic resonance imaging, and biosensors. However, little data is available for $CoFe_2O_4$ nanofluids properties and heat transfer. The thermal conductivity of $CoFe_2O_4$/water nanofluid was measured with the influence of magnetic field and an enhanced thermal conductivity at applied magnetic field of 5000 Oe was observed [A. Karimi, S.S.S. Afghahi, H. Shariatmadar, M, Ashjaee, Thennochim. Acta, 2014]. The rheological properties of $CoFe_2O_4$/water magnetic nanofluids have been investigated at different magnetic field strengths [M. Chand, S. Kumar, A. Shanlcar, R. Porwal, R.P. Pant, J. Non-Crystalline Solids, 361, 2013, 38-42]. The kgfof CoFe204/water nanofluid has been measured with an effect of magnetic field [I, Djurek, A. Znidarsic, A. Kosak, D, Djurek, Croat. Chem. Acta, 80, 2007, 529-532].

Multiferroic hybrid nanocomposites possessing ferroelectricity, ferromagnetism, ferroelasticity and the coupling between them have been under study for their potential applications in various energy harvesting devices. Magnetoelectric coupling has been seen in $Ni_{0.5}Zn_{0.5}Fe_2O_4$@&$BaTiO_3$ based multiferroic fluid at the interface between a ferromagnet and the ferroelectric [R. Gao, Z. Xu, I. Bai, Q. Zhang, z. Wang, W. Cai, G. Chen, X. Deng, X. Cao, X. Luo, C. Fu, Adv. Electron. Mater., 4, 6, 2018, 1800030].

However, very little is known about hybrid nanofluids prepared with magnetic materials and ferroelectric materials, either as combination or as a hybrid nanocomposite. Insufficient data is currently available on the thernophysical properties and heat transfer characteristics with and without the influence of magnetic field.

Accordingly, it is an objective of the present disclosure to provide a magnetic nanofluid that includes magnetic transition metal ferrite nanoparticles, ferroelectric nanoparticles, and a carrier fluid, and a method of changing the temperature of an object (e.g., heating or cooling) using the magnetic nanofluid.

SUMMARY OF THE INVENTION

The present disclosure relates to a method of changing a temperature of an object, the method comprising flowing through a container in contact with the object a magnetic nanofluid comprising magnetic transition metal ferrite nanoparticles, ferroelectric nanoparticles, and a carrier fluid, the magnetic nanofluid having an initial temperature which is different from the temperature of the object, and applying a magnetic field to the magnetic nanofluid while the magnetic nanofluid is within the container in contact with the object.

In some embodiments, the transition metal ferrite nanoparticles are $CoFe_2O_4$ nanoparticles.

In some embodiments, the magnetic transition metal ferrite nanoparticles have a mean size of 25 to 75 nm.

In some embodiments, the ferroelectric nanoparticles are ferroelectric perovskite oxide nanoparticles.

In some embodiments, the ferroelectric perovskite oxide nanoparticles are $BaTiO_3$ nanoparticles.

In some embodiments, the ferroelectric nanoparticles have a mean size of 50 to 250 nm.

In some embodiments, the magnetic transition metal ferrite nanoparticles and ferroelectric nanoparticles are present in the magnetic nanofluid in a ratio of 1:1 to 1:3 by mass.

In some embodiments, the magnetic transition metal ferrite nanoparticles and ferroelectric nanoparticles are present in the magnetic nanofluid at a volume concentration of 0.1% to 2.5%.

In some embodiments, the magnetic transition metal ferrite nanoparticles and ferroelectric nanoparticles are present as a composite comprising an aggregate of the magnetic transition metal ferrite nanoparticles and ferroelectric nanoparticles.

In some embodiments, the composite has a saturation magnetization of 25 to 50 emU/g.

In some embodiments, the carrier fluid is ethylene glycol.

In some embodiments, the magnetic nanofluid has a viscosity of 10 to 35 mPa·s at 20° C.

In some embodiments, the magnetic nanofluid has a density of 1110 to 1180 kg/m3 at 20° C.

In some embodiments, the magnetic nanofluid has a specific heat of 2250 to 2500 J/kg-K at 20° C. and 2575 to 2750 J/kg-K at 60° C.

In some embodiments, the magnetic nanofluid has a thermal conductivity of 0.235 to 0.275 W/m-K at 20° C. and 0.240 to 0.305 W/m-K at 60° C.

In some embodiments, a Nusselt number of the magnetic nanofluid increases by 7.0 to 22.5% when a magnetic field of 4000 G is applied at a Reynolds number of 245 to 350 compared to a Nusselt number in the absence of an applied magnetic field.

In some embodiments, a Nusselt number of the magnetic nanofluid increases by 18.5% to 42.5% when a magnetic field of 4000 G is applied at a Reynolds number of 1200 to 1750 compared to a Nusselt number in the absence of an applied magnetic field.

The present disclosure also relates to a magnetic nanofluid, comprising ethylene glycol, $CoFe_2O_4$ nanoparticles having a mean size of 25 to 75 nm, and $BaTiO_3$ nanoparticles having a mean size of 50 to 250 nm, wherein the $CoFe_2O_4$ nanoparticles and $BaTiO_3$ nanoparticles are present in the magnetic nanofluid in a ratio of 1:1 to 1:3 by mass, and the $CoFe_2O_4$ nanoparticles and $BaTiO_3$ nanoparticles are present in the magnetic nanofluid at a volume concentration of 0.1% to 2.5%.

In some embodiments, the $CoFe_2O_4$ nanoparticles and $BaTiO_3$ nanoparticles are present as a composite comprising an aggregate of the $CoFe_2O_4$ nanoparticles and $BaTiO_3$ nanoparticles.

BRIEF DESCRIPTION OF THE DRAWINGS

FIG. 4A shows thermal conductivity, FIG. 4B shows viscosity, FIG. 4C shows density, and FIG. 4D shows specific heat.

DETAILED DESCRIPTION OF THE INVENTION

Figure 1:
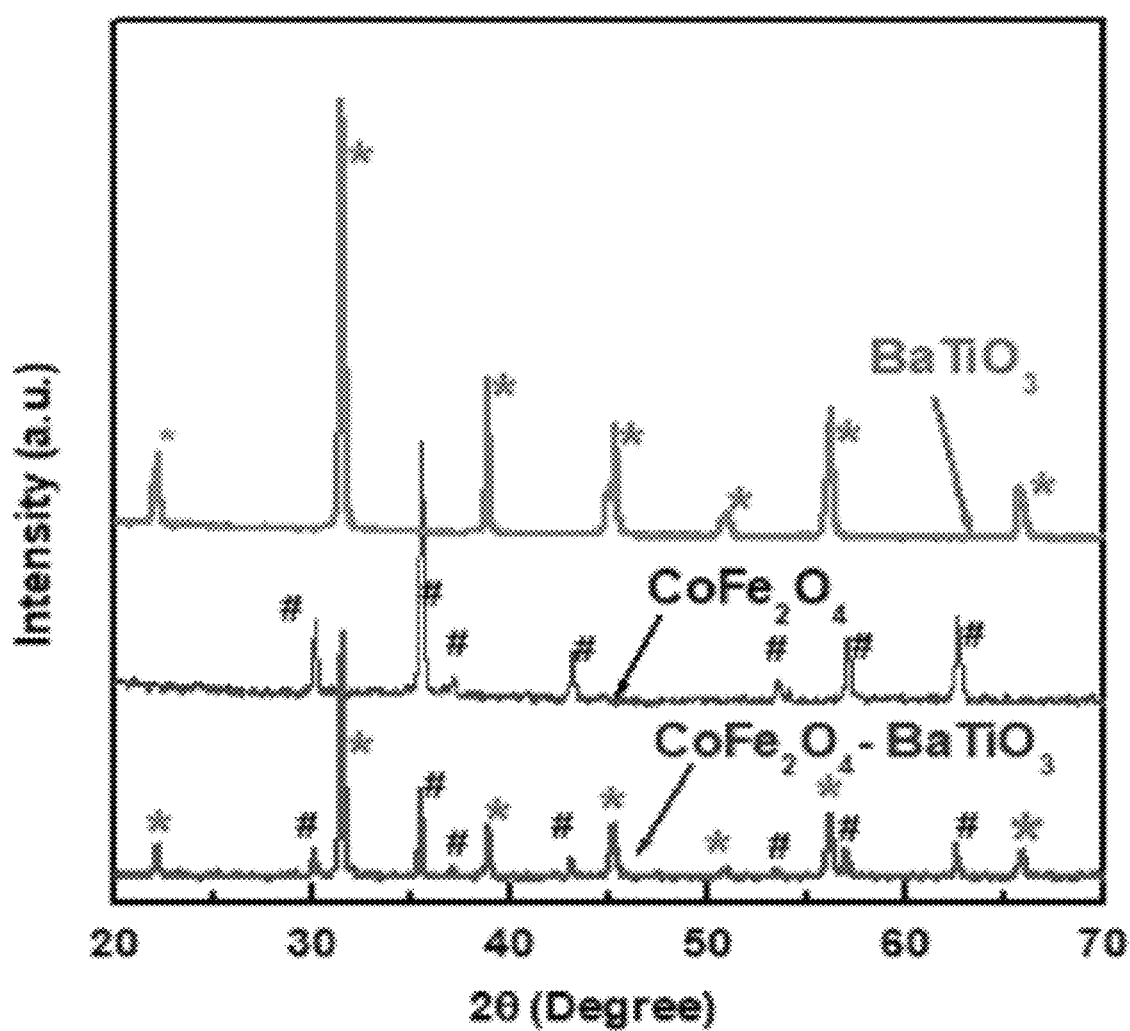
FIG. 1 shows XRD patterns of the synthesized $BaTiO_3$, $CoFe_2O_4$, and $CoFe_2O_4$—$BaTiO_3$ nanoparticles.

In the following description, it is understood that other embodiments may be utilized and structural and operational changes may be made without departure from the scope of the present embodiments disclosed herein.

Definitions

As used herein the words "a" and "an" and the like carry the meaning of "one or more."

As used herein, the terms "optional" or "optionally" means that the subsequently described event(s) can or cannot occur or the subsequently described component(s) may or may not be present (e.g., 0 wt. %).

According to a first aspect, the present disclosure relates to a method of changing a temperature of an object, the method comprising flowing through a container in contact with the object a magnetic nanofluid, the magnetic nanofluid having an initial temperature which is different from the temperature of the object, and applying a magnetic field to the magnetic nanofluid while the magnetic nanofluid is within the container in contact with the object.

Magnetic Nanofluid

In some embodiments, the magnetic nanofluid comprises magnetic transition metal ferrite nanoparticles, ferroelectric nanoparticles, and a carrier fluid.

In some embodiments, the magnetic transition metal ferrite nanoparticles are nanoparticles that include a transition metal ferrite material of formula $MFe_2O_4$, where M is a transition metal. In some embodiments, the magnetic transition metal ferrite nanoparticles consist essentially of the transition metal ferrite material of formula $MFe_2O_4$. In some embodiments, the magnetic transition metal ferrite nanoparticles consist of the transition metal ferrite material of formula $MFe_2O_4$. In some embodiments, M is a transition metal other than iron. In preferred embodiments, M is cobalt. That is, the transition metal ferrite material is $CoFe_2O_4$.

In some embodiments, the transition metal ferrite nanoparticles are crystalline by PXRD. In some embodiments, the transition metal ferrite material crystallizes in the spinel crystal structure. The spinel crystal structure is characterized by a cubic close packed lattice of anions (in this case oxygen anions), in which the cations (M and Fe) occupy some or all of the tetrahedral sites and octahedral sites. In the normal spinel structure, divalent cations occupy tetrahedral holes and trivalent cations occupy octahedral holes. In the inverse spinel structure, the divalent cations occupy octahedral holes while half of the trivalent cations occupy octahedral holes, and the other half of the trivalent cations occupy tetrahedral holes. Intermediate structures between these end members with different cation ordering schemes also exist, including random cation distribution (also known as cation disordered structures). In some embodiments, the transition metal ferrite material crystallizes in the normal spinel structure. In alternative embodiments, the transition metal ferrite material crystallizes in the inverse spinel structure. In other alternative embodiments, the transition metal ferrite material crystallizes in an intermediate spinel structure. In alternative embodiments, the transition metal ferrite nanoparticles are not crystalline by PXRD.

In general, the magnetic transition metal ferrite nanoparticles can be any shape known to one of ordinary skill in the art. Examples of suitable shapes the magnetic transition metal ferrite nanoparticles may take include spheres, spheroids, lentoids, ovoids, solid polyhedra such as tetrahedra, cubes, octahedra, icosahedra, dodecahedra, rectangular prisms, triangular prisms (also known as nanotriangles), nanoplatelets, nanodisks, blocks, flakes, discs, granules, angular chunks, and mixtures thereof. Nanorods or nanowires are not a shape that the magnetic transition metal ferrite nanoparticles are envisioned as having in any embodiments.

In some embodiments, the magnetic transition metal ferrite nanoparticles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of magnetic transition metal ferrite nanoparticles having a different shape. As used herein, the term "non-uniform shape" refers to an average consistent shape that differs by more than 10% of the distribution of magnetic transition metal ferrite nanoparticles having a different shape. In one embodiment, the shape is uniform and at least 90% of the magnetic transition metal ferrite nanoparticles are spherical or substantially circular, and less than 10% are polygonal. In another embodiment, the shape is non-uniform and less than 90% of the magnetic transition metal ferrite nanoparticles are spherical or substantially circular, and greater than 10% are polygonal.

In some embodiments, the magnetic transition metal ferrite nanoparticles have a mean particle size of 10 to 100 nm, preferably 25 to 75 nm, preferably 30 to 70 nm, preferably 35 to 65 nm, preferably 40 to 60 nm, preferably 45 to 55 nm, preferably about 50 nm. In embodiments where the magnetic transition metal ferrite nanoparticles are spherical, the particle size may refer to a particle diameter. In embodiments where the magnetic transition metal ferrite nanoparticles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass.

In some embodiments, the magnetic transition metal ferrite nanoparticles are monodisperse, having a coefficient of variation or relative standard deviation, expressed as a percentage and defined as the ratio of the particle size standard deviation (σ) to the particle size mean (μ) multiplied by 100 of less than 25%, preferably less than 10%, preferably less than 8%, preferably less than 6%, preferably less than 5%, preferably less than 4%, preferably less than 3%, preferably less than 2%. In some embodiments, the magnetic transition metal ferrite nanoparticles of the present disclosure are monodisperse having a particle size distribution ranging from 80% of the average particle size to 120% of the average particle size, preferably 90-110%, preferably 95-105% of the average particle size. In some embodiments, the magnetic transition metal ferrite nanoparticles are not monodisperse.

In some embodiments, the ferroelectric nanoparticles are ferroelectric perovskite oxide nanoparticles. As used herein "perovskite" refers to a material which has the perovskite structure type. The perovskite structure type is a structure adopted by materials which have the general formula $ABX_3$, where A and B are cations which have a ratio of charge on cation A to charge on cation B of 1:2 and X is an anion. Typical ion charge combinations are $A^+B^{2+}X^-_3$ and $A^{2+}B^{4+}X^{2-}_3$. The perovskite structure type is characterized by the presence of an octahedral coordination of the B cation by X anions. These octahedra are arranged in a cubic lattice and are vertex-sharing. The A cations occupy pockets with cubic symmetry defined by 8 of the octahedra. Typically, the arrangement of the octahedra and A cations forms a material with cubic symmetry, however slight distortions may lower the symmetry of the material, for example to tetragonal or orthorhombic. Examples of such distortions include shifts of the B cations such that they are not in the center of the octahedra (off-centering) and tilting of the octahedra such that the center of the octahedra remain in a cubic arrangement, but the orientation of the octahedra results in a non-cubic symmetry. The perovskite structure type is named after a mineral called perovskite, composed of calcium titanate ($CaTiO_3$), which crystallizes in the cubic perovskite structure type. The aforementioned mineral is a member of the class of materials known as "perovskites". Examples of other perovskites include simple perovskites, complex perovskites, layered perovskites, and hybrid perovskites.

Simple perovskites are perovskites which have chemical formulas which conform to the chemical formula explained above. Simple perovskites have only one type of atom occupying the B cation sites in the perovskite structure or fulfill the B cation position in the aforementioned chemical formula. Simple perovskites may have one or more type of atom occupying the A cation sites in the perovskite structure or fulfill the A cation position in the aforementioned chemical formula. Simple perovskites may have one or more type of atom occupying the X anion sites in the perovskite structure of fulfill the X anion position in the aforementioned chemical formula. This description also covers doped perovskites that are doped in both the A and X sites in the structure of A and X positions in the chemical formula. Examples of simple perovskites include calcium titanate ($CaTiO_3$, perovskite), bridgmanite (($Mg,Fe)SiO_3$), bismuth niobate ($BiNbO_3$), barium titanate ($BaTiO_3$), strontium titanate ($SrTiO_3$), strontium zirconate ($SrZrO_3$), lead titanate ($PbTiO_3$), bismuth ferrite ($BiFeO_3$), lanthanum ytterbium oxide ($LaYbO_3$), lanthanum strontium manganite (($La,Sr)MnO_3$), yttrium aluminum perovskite ($YAlO_3$, YAP), lutetium aluminum perovskite ($LuAlO_3$, LuAP), $CsPbI_3$, $CsGeBr_3$, $RbPbI_3$, $CsSnBr_3$, and $RbSbI_3$.

Complex perovskites are perovskites that have more than one type of atom occupying the B cation sites in the perovskite structure of fulfill the B cation position in the aforementioned chemical formula. Complex perovskites may be disordered complex perovskites or ordered complex perovskites. Disordered complex perovskites are complex perovskites where the B cation sites in the perovskite structure are filled with a random distribution of cations able to occupy said sites based on the chemical composition of the material. No long range ordering of the B cations exists. Examples of disordered complex perovskites include lead zirconate titanate ($Pb(Zr,Ti)O_3$, PZT), lead ferrite tantalate ($Pb(Fe,Ta)O_3$), lead scandium tantalate ($Pb(ScTa)O_3$, PST) barium manganite titanate ($Ba(Mn,Ti)O_3$, BMT), and barium manganite niobate ($Ba(Mn,Nb)O_3$, BMN). Ordered complex perovskites are complex perovskites which have long range order and symmetry to the cations occupying the B cations sites in the perovskite structure. An example of ordered complex perovskites are double perovskites, which have a 1:1 mixture of two different B cations, labeled B and B'. Double perovskites are denoted with the formula $AB_{0.5}B'_{0.5}X_3$ or $A_2BB'X_6$. Double perovskites have a similar crystalline unit cell as perovskites, but with dimensions that are twice as large as the parent, simple perovskites. Other examples of ordered complex perovskites have B:B' cation ratios of 1:2 ($AB_{0.33}B'_{0.67}X_3$) or 1:3 ($AB_{0.25}B'_{0.75}X_3$). Examples of ordered complex perovskites include $Sr_2FeMoO_6$, $Sr_2NiIrO_6$, and $BaZn_{0.33}Ta_{0.67}O_3$.

Layered perovskites are materials in which sheets of the $ABX_3$ structure are separated by sheets of a different material. Layered perovskites may be classified based on the chemical formula of the different material into Aurivillius phase, Dion-Jacobson phase, and Ruddlesden-Popper phase layered perovskites. Aurivillius phase layered perovskites are materials in which the different material comprises $[Bi_2O_2]^{2+}$ ions occurring every n layers (where n is an integer from 1 to 5) to give a material with the overall formula $Bi_2A_{(n-1)}B_nO_{(3n+3)}$ or $[Bi_2O_2]\text{-}A_{(n-1)}B_nO_{(3n+1)}$. Examples of Aurivillius phase layered perovskites include $[Bi_2O_2]BiTi_2O_7$, $Bi_2MoO_6$, and $SrBi_2Nb_2O_9$. Dion-Jacobson phase layered perovskites are materials in which the different material is composed of an alkali metal layer ever n layers (where n is an integer from 1 to 5) to give a material with the overall formula $MA_{(n-1)}B_nO_{(3n+1)}$ where M is an alkali metal. Examples of Dion-Jacobson phase layered perovskites include $KLaNb_2O_7$, $CsLaNb_2O_7$, $CsBa_2Ta_3O_{10}$, and $KSr_2Nb_3O_{10}$. Ruddlesden-Popper phase layered perovskites are materials in which the different material is a layer of cations A', which may be any cations that would occupy an A cation site in a perovskite material, occurring every n layers, where n=1 or 2, giving the material the overall formula $A'_nA_{(n-1)}B_nO_{(3n+1)}$. Examples of Ruddlesden-Popper layered perovskites include $Sr_2RuO_4$, $Sr_3Ru_2O_7$, $Sr_2TiO_4$, $Ca_2MnO_4$, and $SrLaAlO_4$.

Hybrid perovskites are perovskite materials in which one or more of the cations is an organic cation such as ammonium, organoammonium, formamidinium. Examples of hybrid perovskites include methylammonium lead iodide ($CH_3NH_3PbI_3$), methylammonium tin bromine ($CH_3NH_3SnBr_3$), and formamidinium lead iodide ($NH_2CHNH_2PbI_3$).

It should be noted that halide perovskites such as the examples listed above, are not envisioned as being part of the invention in any embodiment. While halide perovskites may display ferroelectric behavior, such materials are not oxides. Thus, they may not act as the ferroelectric perovskite oxide component.

In general, the ferroelectric perovskite oxide may be any suitable perovskite oxide, as defined above, which displays ferroelectric behavior. Examples of ferroelectric perovskite oxides include, but are not limited to barium titanate ($BaTiO_3$), lithium niobate ($LiNbO_3$), bismuth ferrite ($BiFeO_3$), lead titanate ($PbTiO_3$), lead zirconate ($PbZrO_3$), sodium bismuth titanate ($Na_{0.5}Bi_{0.5}TiO_3$), lead zirconate titanate ($Pb(Zr,Ti)O_3$, PZT), lead bismuth niobate ($PbBi_2Nb_2O_9$), strontium bismuth tantalate ($SrBi_2Ta_2O9$), and bismuth titanate ($Bi_4Ti_3O_{12}$). In some embodiments, the ferroelectric perovskite oxide is substantially free of lead. In preferred embodiments, the ferroelectric perovskite oxide is barium titanate ($BaTiO_3$). In some embodiments, the ferroelectric perovskite oxide nanoparticles are $BaTiO_3$ nanoparticles.

In general, the ferroelectric nanoparticles can be any shape known to one of ordinary skill in the art. Examples of suitable shapes the ferroelectric nanoparticles may take include spheres, spheroids, lentoids, ovoids, solid polyhedra such as tetrahedra, cubes, octahedra, icosahedra, dodecahedra, rectangular prisms, triangular prisms (also known as nanotriangles), nanoplatelets, nanodisks, blocks, flakes, discs, granules, angular chunks, and mixtures thereof. Nanorods or nanowires are not a shape that the ferroelectric nanoparticles are envisioned as having in any embodiments.

In some embodiments, the ferroelectric nanoparticles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of ferroelectric nanoparticles having a different shape. As used herein, the term "non-uniform shape" refers to an average consistent shape that differs by more than 10% of the distribution of ferroelectric nanoparticles having a different shape. In one embodiment, the shape is uniform and at least 90% of the ferroelectric nanoparticles are spherical or substantially circular, and less than 10% are polygonal. In another embodiment, the shape is non-uniform and less than 90% of the ferroelectric nanoparticles are spherical or substantially circular, and greater than 10% are polygonal.

In some embodiments, the ferroelectric nanoparticles have a mean particle size of 50 to 250 nm, preferably 60 to 225 nm, preferably 65 to 200 nm, preferably 70 to 175 nm, preferably 75 to 150 nm, preferably 80 to 125 nm, preferably 85 to 115 nm, preferably 90 to 110 nm, preferably 95 to 105 nm, preferably about 100 nm. In embodiments where the ferroelectric nanoparticles are spherical, the particle size may refer to a particle diameter. In embodiments where the ferroelectric nanoparticles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass.

In some embodiments, the ferroelectric nanoparticles are monodisperse, having a coefficient of variation or relative standard deviation, expressed as a percentage and defined as the ratio of the particle size standard deviation (a) to the particle size mean (p) multiplied by 100 of less than 25%, preferably less than 10%, preferably less than 8%, preferably less than 6%, preferably less than 5%, preferably less than 4%, preferably less than 3%, preferably less than 2%. In some embodiments, the ferroelectric nanoparticles of the present disclosure are monodisperse having a particle size distribution ranging from 80% of the average particle size to 120% of the average particle size, preferably 90-110%, preferably 95-105% of the average particle size. In some embodiments, the ferroelectric nanoparticles are not monodisperse.

In some embodiments, the magnetic transition metal ferrite nanoparticles and ferroelectric nanoparticles are present in the magnetic nanofluid in a ratio of 1:1 to 1:3, preferably 1:1.25 to 1:2.5, preferably 1:1.5 to 1.2.25, preferably 1:1.6 to 1:2.0, preferably 1:1.7 to 1:1.95, preferably 1:1.8 to 1:1.9, preferably 1:1.85 to 1:1.87, preferably 1:1.86 by mass.

In some embodiments, the magnetic transition metal ferrite nanoparticles and ferroelectric nanoparticles are present in the magnetic nanofluid at a volume concentration of 0.05% to 2.5%, preferably 0.1% to 2.0%, preferably 0.25% to 1.75%, preferably 0.3% to 1.5%, preferably 0.4% to 1.25%, preferably 0.5% to 1.0%.

In some embodiments, the magnetic transition metal ferrite nanoparticles and ferroelectric nanoparticles are present as a composite comprising an aggregate of the magnetic transition metal ferrite nanoparticles and ferroelectric nanoparticles. As used herein, the term "aggregate" refers to a clustered particulate composition comprising primary particles, the primary particles being aggregated together in such a way so as to form clusters thereof, at least 50 volume percent of the clusters having a mean diameter that is at least 2 times the mean diameter of the primary particles, and preferably at least 90 volume percent of the clusters having a mean diameter that is at least 5 times the mean diameter of the primary particles. The primary particles may be the magnetic transition metal ferrite nanoparticles and ferroelectric nanoparticles having a mean diameter as previously described. In some embodiments, the surface of the particles or agglomerates of the magnetic transition metal ferrite nanoparticles and ferroelectric nanoparticles are irregular and non-smooth. In some embodiments, the surface of the magnetic transition metal ferrite nanoparticles and ferroelectric nanoparticles have or comprise an irregular arrangement of magnetic transition metal ferrite nanoparticles and ferroelectric nanoparticles.

In some embodiments, the composite has a saturation magnetization of 25 to 50 emU/g, preferably 27.5 to 40 emU/g, preferably 29 to 37.5 emU/g, preferably 30 to 35 emU/g, preferably 31 to 33 emU/g, preferably 32 emU/g.

In general, the carrier fluid can be any suitable carrier fluid in which the nanoparticles described above can be dispersed. Examples of suitable carrier fluids include, but are not limited to, water;

alcohols such as methanol, ethanol,1-propanol, 2-propanol, 1-butanol, 2-butanol, tert-amyl alcohol, 2-methyl-1-butanol, undecanols (e.g., 1-undecanol), dodecanols (e.g., 1-dodecanol), tridecanols (e.g., 1-tridecanol), tetradecanols (e.g., 1-tetradecanol), including terpene alcohols such as monoterpene alcohols (e.g., terpineol, geraniol, citronellol, linalool, etc.);

ketones such as acetone, methylethylketone, diethylketone, diphenylketone, dibenzylketone, acetophenone, cyclopentanone, methyl isopropyl ketone, methyl n-propyl ketone, ethyl isopropyl ketone (also known as 2-methyl-3-pentanone), 2-hexanone (also known as methyl butyl ketone), methyl isobutyl ketone, 3-hexanone, 3-pentanone, 2-pentanone, cyclohexanone, and diacetone alcohol;

ethers such as dimethyl ether, diethyl ether, dipropyl ether, methyl tert-butyl ether, tetrahydrofuran, 1,4-dioxane, dibutyl ether, and di-tert-butyl ether;

polyols (also known as glycols) such as ethylene glycol, propylene glycol, 1,3-propanediol, 1,2-butanediol, 1,3-butanediol, 1,4-butanediol, 2,3-butanediol, 1,5-pentanediol, neopentyldiol, 1,6-hexanediol, and 2-methyl-2,4-pentanediol;

glycol ethers including monoalkyl glycol ethers, dialkyl glycol ethers, and monoalkyl monoester glycol ethers, such as ethylene glycol monomethyl ether (2-methoxyethanol), ethylene glycol monoethyl ether (2-ethoxyethanol), ethylene glycol mono-isopropyl ether (2-isopropoxyethanol), ethylene glycol mono-n-propyl ether (2-propoxyethanol), ethylene glycol mono-t-butyl ether, ethylene glycol monobutyl ether, ethylene glycol mono-isobutyl ether, ethylene glycol monophenyl ether (2-phenoxyethanol), ethylene glycol monobenzyl ether (2-benzyloxyethanol), diethylene glycol monomethyl ether (2-(2-methoxyethoxy)ethanol), diethylene glycol monoethyl ether (2-(2-ethoxyethoxy)ethanol), propylene glycol monomethyl ether (1-methoxy-2-propanol), propylene glycol monoethyl ether, propylene glycol mono-t-butyl ether, propylene glycol mono-n-propyl ether, propylene glycol mono-isopropyl ether, propylene glycol mono-n-butyl ether, dipropylene glycol monomethyl ether, propylene glycol methyl ether acetate, ethylene glycol dimethylether (dimethoxyethane), ethylene glycol diethyl ether (diethoxyethane), diethylene glycol dimethylether, diethylene glycol methyl ethyl ether, diethylene glycol diethylether, dipropylene glycol dimethyl ether, dipropylene glycol mono-n-propyl ether;

esters such as methyl acetate, ethyl acetate, n-butyl acetate, methyl lactate, ethyl lactate, butyl lactate, methoxyethyl acetate, ethoxyethyl acetate, methoxypropyl acetate, and ethoxypropyl acetate;

acetals such as 1,3-dioxolane;

amides such as dimethylformamide and dimethylacetamide;

acetonitrile as well as mixtures of two or more thereof.

In some embodiments, the carrier fluid comprises ethylene glycol. In some embodiments, the carrier fluid is ethylene glycol.

In some embodiments, the magnetic nanofluid has a viscosity of 10 to 35 mPa·s, preferably 12.5 to 32.5 mPa·s, preferably 15 to 30 mPa·s, preferably 15.75 to 27.5 mPa·s at 20° C. In some embodiments, the magnetic nanofluid has a viscosity of 7.5 to 25 mPa·s, preferably 8.5 to 22.5 mPa·s, preferably 9.5 to 20 mPa·s, preferably 10.5 to 17.25 mPa·s at 30° C. In some embodiments, the magnetic nanofluid has a viscosity of 5 to 17.5 mPa·s, preferably 6 to 15 mPa·s, preferably 7 to 12.5 mPa·s, preferably 7.75 to 11.5 mPa·s at 40° C. In some embodiments, the magnetic nanofluid has a viscosity of 2.5 to 12.5 mPa·s, preferably 3.5 to 10 mPa·s, preferably 4.5 to 9 mPa·s, preferably 5.5 to 8 mPa-s at 50° C. In some embodiments, the magnetic nanofluid has a viscosity of 1 to 7.5 mPa·s, preferably 2.5 to 6.5 mPa·s, preferably 3.5 to 6 mPa·s, preferably 4.25 to 5.75 mPa·s at 60° C.

In some embodiments, the magnetic nanofluid has a density of 1110 to 1180 $kg/m^3$, preferably 1115 to 1175 $kg/m^3$, preferably 1120 to 1170 $kg/m^3$ at 20° C. In some embodiments, the magnetic nanofluid has a density of 1105 to 1175 $kg/m^3$, preferably 1110 to 1170 $kg/m^3$, preferably 1115 to 1165 $kg/m^3$ at 30° C. In some embodiments, the magnetic nanofluid has a density of 1115 to 1165 $kg/m^3$, preferably 1110 to 1160 $kg/m^3$, preferably 1105 to 1157.5 $kg/m^3$ at 40° C. In some embodiments, the magnetic nanofluid has a density of 1090 to 1160 $kg/m^3$, preferably 1095 to 1155 $kg/m^3$, preferably 1100 to 1150 $kg/m^3$ at 50° C. In some embodiments, the magnetic nanofluid has a density of 1100 to 1155 $kg/m^3$, preferably 1095 to 1150 $kg/m^3$, preferably 1090 to 1145 $kg/m^3$ at 60° C.

In some embodiments, the magnetic nanofluid has a specific heat of 2250 to 2500 J/kg-K, preferably 2275 to 2475 J/kg-K, preferably 2300 to 2450 J/kg-K, preferably 2320 to 2440 J/kg-K, at 20° C. In some embodiments, the magnetic nanofluid has a specific heat of 2325 to 2575 J/kg-K, preferably 2350 to 2550 J/kg-K, preferably 2375 to 2525 J/kg-K, preferably 2400 to 2500 J/kg-K, at 30° C. In some embodiments, the magnetic nanofluid has a specific heat of 2450 to 2625 J/kg-K, preferably 2475 to 2600 J/kg-K, preferably 2500 to 2575 J/kg-K, preferably 2510 to 2555 J/kg-K, at 40° C. In some embodiments, the magnetic nanofluid has a specific heat of 2475 to 2625 J/kg-K, preferably 2500 to 2650 J/kg-K, preferably 2525 to 2625 J/kg-K, preferably 2535 to 2615 J/kg-K, at 50° C. In some embodiments, the magnetic nanofluid has a specific heat of 2575 to 2750 J/kg-K, preferably 2595 to 2725 J/kg-K, at 60° C.

In some embodiments, the magnetic nanofluid has a thermal conductivity of 0.235 to 0.275 W/m-K, preferably 0.2375 to 0.2725 W/m-K, preferably 0.240 to 0.270 W/m-K, preferably 0.2425 to 0.675 W/m-K, preferably 0.245 to 0.265 at 20° C. In some embodiments, the magnetic nanofluid has a thermal conductivity of 0.2375 to 0.280 W/m-K, preferably 0.240 to 0.2775 W/m-K, preferably 0.2425 to 0.275 W/m-K, preferably 0.245 to 0.2725 W/m-K, preferably 0.2475 to 0.270 at 30° C. In some embodiments, the magnetic nanofluid has a thermal conductivity of 0.2375 to 0.285 W/m-K, preferably 0.240 to 0.2825 W/m-K, preferably 0.2425 to 0.280 W/m-K, preferably 0.245 to 0.2775 W/m-K, preferably 0.2475 to 0.275 at 40° C. In some embodiments, the magnetic nanofluid has a thermal conductivity of 0.2375 to 0.295 W/m-K, preferably 0.240 to 0.2925

W/m-K, preferably 0.2425 to 0.290 W/m-K, preferably 0.245 to 0.2875 W/m-K, preferably 0.2475 to 0.285 at 50° C. In some embodiments, the magnetic nanofluid has a thermal conductivity of 0.240 to 0.305 W/m-K, preferably 0.2425 to 0.3025 W/m-K, preferably 0.245 to 0.300 W/m-K, preferably 0.2475 to 0.295 W/m-K, preferably 0.25 to 0.2925 at 60° C.

In some embodiments, a Nusselt number of the magnetic nanofluid increases by 7.0 to 22.5%, preferably 8.0 to 22.0%, preferably 9.0 to 21.5%, preferably 10.0 to 21.0%, preferably 11.0 to 20.5% when a magnetic field of 4000 G is applied at a Reynolds number of 245 to 350 compared to a Nusselt number in the absence of an applied magnetic field, and In some embodiments, a Nusselt number of the magnetic nanofluid increases by 18.5% to 42.5%, preferably 20.5 to 42.0%, preferably 22.5 to 41.5%, preferably 23.5 to 41.0%, preferably 24.5 to 40.5%, preferably 25.5 to 40.0%, preferably 26.5 to 39.5%, preferably 27.5 to 39.0%, preferably 28.5 to 38.5%, preferably 29.5 to 38.0%, preferably 30.5 to 37.5% when a magnetic field of 4000 G is applied at a Reynolds number of 1200 to 1750 compared to a Nusselt number in the absence of an applied magnetic field.

Method of Changing Temperature of an Object

The present disclosure relates to a method of changing a temperature of an object, the method comprising flowing through a container in contact with the object a magnetic nanofluid comprising magnetic transition metal ferrite nanoparticles, ferroelectric nanoparticles, and a carrier fluid, the magnetic nanofluid having an initial temperature which is different from the temperature of the object, and applying a magnetic field to the magnetic nanofluid while the magnetic nanofluid is within the container in contact with the object.

In general, the container through which the magnetic nanofluid is flowed can be of any shape and volume. In some embodiments, the container is a heat exchanger. Any suitable type of heat exchanger can be used. Examples of types of heat exchangers include a double-pipe heat exchanger, a shell-and-tube heat exchanger, a plate heat exchanger, a plate fin heat exchanger, a finned tube heat exchanger, a pillow plate heat exchanger, a helical coil heat exchanger, and a spiral coil heat exchanger. A double-pipe heat exchanger in one in which one fluid flows through the smaller pipe, the other flows through the annular gap between the inner pipe and an outer pipe which encompasses the inner pipe. The flow in a double-pipe heat exchanger may be parallel or counter-flows in a double pipe heat exchanger. In the parallel flow configuration both fluids enter the heat exchanger from the same side, flow in the same direction and exit at the same end. This configuration is preferable when the two fluids are intended to reach exactly the same temperature, as it reduces thermal stress and produces a more uniform rate of heat transfer. In the counter-flow configuration, both fluids enter opposite sides of the heat exchanger, flow in opposite directions, and exit at opposite ends. This configuration is preferable when the objective is to maximize heat transfer between the fluids, as it creates a larger temperature differential when used under otherwise similar conditions. A shell-and-tube heat exchanger, one fluid flows through an inner tube while a second fluid is circulated through a exterior shell. In this configuration, a shell may encompass any number of tubes through which the first fluid flows. Baffles may be used to support the tubes, direct the fluid flow around, and/or maximize the turbulence of the shell fluid. In either shell-and-tube or double-pipe heat exchanges, one tube can be formed into the shape of a helical coil to form a helical coil heat exchanger. In a tube-and-shell heat exchanger, the both the tube and shell can be in the form of intertwined helices, forming a spiral heat exchanger. A plate heat exchanger includes a plurality of plates with a gap formed between adjacent pairs of plates. The gap defines a channel through which a fluid can flow. The plates may be of any sizes and shape, including corrugated shapes or shapes which have additional projections such as fins, and can define a gap of any size. The plates may be arranged into any suitable arrangement and can include any suitable external features to define sub-types of plate heat exchanges, including plate and frame, plate and shell, fin plate, pillow plate, and spiral plate heat exchangers.

In some embodiments, the object is a fluid. In some embodiments, the fluid is flowed through a tube or pipe in direct contact with the magnetic nanofluid. In some embodiments, the fluid is flowed through a tube, pipe, or other similar structure which is in contact with the container which contains the magnetic nanofluid. That is, the tube, pipe, or other similar structure which has the fluid is not in direct contact with the magnetic nanofluid. In some embodiments, the object is a solid. In some embodiments, the object is a component of a heat exchanger as described above, such as a plate.

In general, the magnetic nanofluid can be flowed using any suitable flow rate. In some embodiments, the magnetic nanofluid is flowed at a rate of 0.001 to 1.00 kg/s, preferably 0.005 to 0.5 kg/s, preferably 0.01 to 0.25 kg/s, preferably 0.025 to 0.2 kg/s, preferably 0.033 to 0.166 kg/s.

The magnetic nanofluid can be flowed using any suitable method or with any suitable device or combination of devices. For example, the magnetic nanofluid can be flowed using a pump. In general, any suitable type of pump may be used, such as a piston pump, a circumferential-piston pump, diaphragm and bellows pumps, gear pumps, lobed pumps, nutating pumps, peristaltic pumps, centrifugal pumps, volute and diffuser pumps, propeller and mixed-flow pumps, and peripheral pumps.

Plunger or piston pumps are categorized as positive-displacement pumps, and usually contain one or more pistons that draw fluid through an inlet check valve and expel it through an outlet valve. The volume of fluid delivered depends on plunger diameter and stroke length; diameter cannot be varied in a given pump, so stroke length is made adjustable.

Circumferential-piston pumps use counter rotating rotors driven by external timing gears. They are self-priming and have high suction lift capability. With capacities up to 450 gallons per minute (gpm), the pumps are often used for shear-sensitive fluids, or those with entrained particles or gases.

Diaphragm and bellows pumps are used when pump leakage or process-fluid contamination cannot be tolerated. They offer the freedom from external leakage of a peristaltic pump, yet permit higher pressures and easy flow adjustment. Diaphragm and bellows pumps end to cost more than peristaltic pumps for the same flow delivered. Generally, diaphragm pumps are built like a plunger unit, except that a bellows or diaphragm is fitted to the end of the plunger shaft.

Gear pumps, often used in fluid-power applications, perform equally as well as fluid-handling pumps. The gears can be arranged as a pair of similarly sized gears, as three stacked gears, as separated internal gears, or as gerotors. Displacement of gear pumps is fixed, and cannot be varied during operation.

Lobed pumps resemble gear pumps. Motion of the rotors creates an expanding cavity on the inlet side, a constant-volume cavity that carries fluid to the outlet side, and a contracting cavity that forces fluid out. In some models, rotors are driven by external timing gears to avoid rotor contact in the fluid stream. Lobed pumps have relatively large displacement, so they are often used for shear-sensitive fluids, as well as fluids with entrained gases or particles.

Nutating pumps have a disc, held between two plates that wobbles without rotating and creates line contact with both plates. As the contact lines pass the inlet port, liquid is pulled into the cavities between the disc and plates. The fluid, then, is swept through the pump to the discharge port where it is released under pressure. A bridge separates inlet flow from outlet flow.

Peristaltic pumps includes a flexible tube that is progressively compressed by a series of rollers. As the rollers move along the tube, they force fluid through it. An advantage of these pumps is freedom from external leakage. Fluid is contained within the tube, and can leak only if the tube ruptures. Peristaltic pumps are simple and quite inexpensive for the flow rates they provide.

Centrifugal pumps are a practical choice for fairly constant, large flows of over 100 gpm at moderate pressures and low fluid viscosities. The first step in selecting a centrifugal pump is to determine application requirements: quantity of flow, pressure rise (or change in head) in feet of fluid, and other conditions such as high fluid viscosity or temperature.

Volute and diffuser pumps draw liquid into the impeller at its center and fling it outward by centrifugal force. The liquid leaves the impeller with higher pressure and velocity than when it entered. The velocity—especially its tangential component—is then partially transformed into additional pressure by the pump casing. The amount of energy transformed and efficiency of the transformation depend upon the shape of the casing.

In propeller pumps, liquid is drawn into the pump, parallel to the axis of the impeller, and is pushed out with no change in the direction of flow. Propeller pumps are available for vertical or horizontal operation.

Mixed-flow pumps can produce a larger range of heads than straight pumps. Because the rotors are similar to those in water turbines, this pump is often called a turbine pump. In a mixed-flow pump, the head is generated partly by propeller action and partly by centrifugal force in a volute casing. As with the propeller type, the mixed-flow pump can have only a single-section inlet. Thus, the mixed flow pump bridges the gap between the propeller and purely centrifugal types.

Peripheral pumps have circular, rotating impellers but provide characteristics similar to those of a positive-displacement pump. These low-volume, high-head pumps deliver 1 to 50 gpm and up to 500 feet (ft) of head discharge. These pumps typically have excellent suction characteristics, drawing up to 28 ft of head. They are sometimes called turbine-vane, viscous-drag, or regenerative pumps. Peripheral pumps usually cost less than centrifugal or positive-displacement pumps, but often have a much shorter life.

In general, the magnetic field can be applied at any location of the container. In some embodiments, the magnetic field is applied at a location within a contact area between the object and the container. In some embodiments, the magnetic field is applied at a location within a first 1/3 of a contact area between the object and the container. The first 1/3 of the contact area can be measured from a point at which the contact area begins which is most upstream in the flow of the magnetic nanofluid.

In general, the magnetic field can be applied using any suitable device or apparatus. For example, the magnetic field can be applied using a permanent magnet, an an electromagnet, or both. A permanent magnet refers to an object made from a material that is magnetized and creates its own persistent magnetic field. Examples of permanent magnets include, but are not limited to alnico magnets, samarium cobalt magnets, ferrite magnets, and neodymium magnets. Ferrite magnets are typically made of iron oxide and can include other ceramic materials such as barium or strontium carbonate. Alnico magnets include a combination of aluminium, nickel, and cobalt (AlNiCo), and typically include iron and small amounts of other elements added to enhance the properties of the magnet. A neodymium magnet (also known as NdFeB, NIB or Neo magnet) is a permanent magnet made from an alloy of neodymium, iron, and boron, typically forming the $Nd_2Fe_{14}B$ tetragonal crystalline structure. A samarium-cobalt (SmCo) magnet is a type of rare-earth magnet containing an alloy of samarium and cobalt and sometimes including other elements like zirconium, hafnium, and such added in small quantities.

An electromagnet is a type of magnet in which the magnetic field is produced by an electric current. Electromagnets usually consist of wire wound into a coil. A current through the wire creates a magnetic field which is concentrated in the hole in the center of the coil. The magnetic field disappears when the current is turned off. The main advantage of an electromagnet over a permanent magnet is that the magnetic field can be quickly changed by controlling the amount of electric current in the winding. However, unlike a permanent magnet that needs no power, an electromagnet requires a continuous supply of current to maintain the magnetic field.

In general, the magnetic field can have any strength. Magnetic field strength is a measure of the intensity of a magnetic field in a given area of that field. In some embodiments, the magnetic field has a strength of 250 to 10,000 Oe, preferably 500 to 7500 Oe, preferably 1000 to 5000 Oe, preferably 1600 to 4000 Oe.

In some embodiments, a temperature of the magnetic nanofluid does not exceed the boiling point of the magnetic nanofluid. The boiling point can be a normal boiling point, a boiling point at ambient atmospheric pressure where the method is being performed, or in the case in which the magnetic nanofluid is being flowed at a pressure that his not the ambient atmospheric pressure where the method is being performed, the pressure at which the magnetic nanofluid is being flowed.

The examples below are intended to further illustrate protocols for preparing, characterizing, and using the nanofluid as well as performing the method of changing the temperature of an object and are not intended to limit the scope of the claims.

Where a numerical limit or range is stated herein, the endpoints are included. Also, all values and subranges within a numerical limit or range are specifically included as if explicitly written out.

TABLE 1

Variables, symbols, and labels used in the examples.

EXAMPLES

| Variable | Description and Units |
|---|---|
| A | Area ($m^2$) |
| $\vec{B}$ | Magnetic Field (gauss) |
| $C_p$ | Specific Heat (J/kg · K) |
| D | Particle Size (nm) |

TABLE 1-continued

Variables, symbols, and labels used in the examples.

EXAMPLES

| | |
|---|---|
| $d_i$ | Inside Diameter (mm) |
| $d_o$ | Outside Diameter (mm) |
| f | Factor in friction |
| h | Heat Transfer (W/m$^2$K) |
| 1 | Current (A) |
| k | Thermal Conductivity (W/m · K) |
| ṁ | Mass Flow (kg/s) |
| Nu | Nusselt Number (h$D_i$/k) |
| Pr | Prandtl number (μ × $C_p$/k) |
| $Q_h$ | Heat Given (W) |
| $Q_a$ | Heat Gained (W) |
| $Q_{avg}$ | Mean Heat (W) |
| Re | Reynolds number (4 ṁ/π$D_i$μ) |
| T | Temperature (° C.) |
| TPF | Thermal Performance Factor |
| V | Voltage |
| v | Fluid Velocity (m/s) |
| W | Weight (g) |
| x | Distance (mm) |

| Symbols | Description and Units |
|---|---|
| ρ | Density (kg/m$^3$) |
| λ | Wavelength |
| θ | Bragg Angle |
| φ | Volume Loading (%) |
| ΔP | Drop in Pressure |
| μ | Viscosity (mPa · s) |

| Label | Description |
|---|---|
| i | Inside |
| m | Mean |
| o | Outside |
| w | Surface |

Synthesis Procedure

High-purity (>99.9%, Sigma Aldrich Chemicals, USA) reagent grade chemicals like Barium Acetate (Ba(OOCCH$_3$)$_2$), Titanium Butoxide (Ti(C$_4$H$_9$O)$_4$), Cobalt Nitrate (Co(NO$_3$)$_3$, and Iron Nonahydrate (Fe(NO$_3$)$_3$·9H$_2$O) were used for the synthesis of hybrid nanoparticles. Glacial acetic acid and 2-methoxyethanol were used as solvents and chelating agents. Ethylene glycol (EG) was used as a base fluid.

The CoFe$_2$O$_4$ and BaTiO$_3$ nanoparticles were synthesized by using the sol-gel method. The synthesis method involved 3-steps. In the first step of synthesis, stoichiometric mixtures of cobalt nitrate and iron nitrate nonahydrate were dissolved separately in 2-methoxyethanol. The solutions were mixed together and stirred at 40° C. for 8 hr. The resulting solution was dried on a hot plate at 100° C. for 12 hr to obtain the gel which was subsequently heat treated at 150° C. for 2 hr followed by 700° C. for 4 hr. In the second step of synthesis, a stoichiometric amount of barium acetate was dissolved in acetic acid and stirred at 80° C. for 1 hr. In the third step, a titanate solution was separately prepared by dissolving titanium butoxide in 2-methoxyethanol and stirred at 50° C. for 30 min. The final step was combining all the solutions. At room temperature, the Ti solution was added drop wise to the Ba solution and the resulting clear transparent solution was stirred vigorously at 60° C. for 6 hr. The solution was then dried in an oven overnight to obtain the amorphous BaTiO$_3$ gel which was subsequently heat treated at 250° C. for 2 hr and 900° C. for 4 hr. The obtained two individual CoFe$_2$O$_4$ and BaTO$_3$ nanoparticles were milled together to form 35% of CoFe$_2$O$_4$ and 65% of BaTiO$_3$ by ball milling and heat treated at 700° C. for 2 hr. The resulting hybrid composite was utilized for the characterization as well as hybrid nanofluid preparation.

The structural investigations of BaTiO$_3$, CoFe$_2$O$_4$ and CoFe$_2$0,4-BaTiO$_3$ hybrid nanocomposite were performed through X-ray powder diffraction using a Phillips X-ray diffractometer having a RTMS detector (PIXcel, 1D linear), graphite monochromator, Cu Kα. radiation source operated at 45 kV and 40 mA, 2θ range of 10-120°, virtual step scan of 0.0110 2θ, and virtual time per step of 798s. The Transmission Electronic Microscope (TEM) imaging was performed with JEOL 2010 (200 kV) high-resolution TRM and the magnetic measurement was analyzed with Vibrating Sample Magnetometer (VSM), Cryogenic, UK. The XRD patterns of BaTiO$_3$, CoFe$_2$O$_4$, and CoFe$_2$O$_4$—BaTiO$_3$ nanoparticles are shown in FIG. 1. The XRD patterns of BaTiO$_3$ confirmed the formation of ultra-pure barium titanate with no additional crystallographic phases. The peak splitting around 2θ=450 and 670 suggested that the formation of tetragonal phase having P4 mm symmetry which can be matched with the literature. The evaluated lattice parameters (a:=: 4.001 Å, c=4.029 Å) are larger compared to the bulk BaTIO$_3$ (a=3.94 Å, c=4.03 A of reference IWD-PDF:00-005-0626), which indicates unit cell expansion correlated to lattice strain due to size as observed in previous studies. The size effects in BaTiO$_3$ are correlated to factors like the presence of larger sized Ti$^{3+}$ ions, lattice defects and surface effect on fine particles. See Yashima et. al. J. Appl. Phys., 98, 12, 2005, 014313 and Ramana et. al., J. Mater. Chem. C., 4, 2016, 1066-1079, incorporated herein by reference in its entirety.

The synthesized CoFe$_2$O$_4$ displayed the typical peaks (220), (311), (222), (400), (422), (511), and (440) at the corresponding 2θ angles of 30.07°, 35.470, 36.980, 43,14°, 53.410, 56.350, and 62.59°, respectively. The cubic lattice value for CoFe$_2$O$_4$ nanoparticles was 8.399 Å, which is in good agreement with the bulk material's lattice parameter of 8.39 A [E.V. Gopalan, et. al., J. Alloys Compd., 485, 1-2, 2009, 711-17; A.B. Rajput, et. al., J. Exp. Nanosci., 8, 4, 2013, 629-639, incorporated herein by reference in its entirety]. Additionally, the CoFe$_2$O$_4$—BaTiO$_3$ nanocomposite displayed peaks for each of the two involved phases with appropriate intensities for the composition. The composite material's lattice parameters for BaTiO$_3$ and CoFe$_2$O$_4$ were 4.011 A and 8.392 Å, respectively. The changes that occurred (smaller unit cell compared to the parent phases) can be due to the compressive stress induced due to the formation of a composite with a lattice mismatch. The crystallite size of composite nanoparticles was calculated at the high-intensity peak of (311) using Scherrer's formula: D=0.9W/CosO and was found to be approximately 89.68 nm.

Figure 2A:
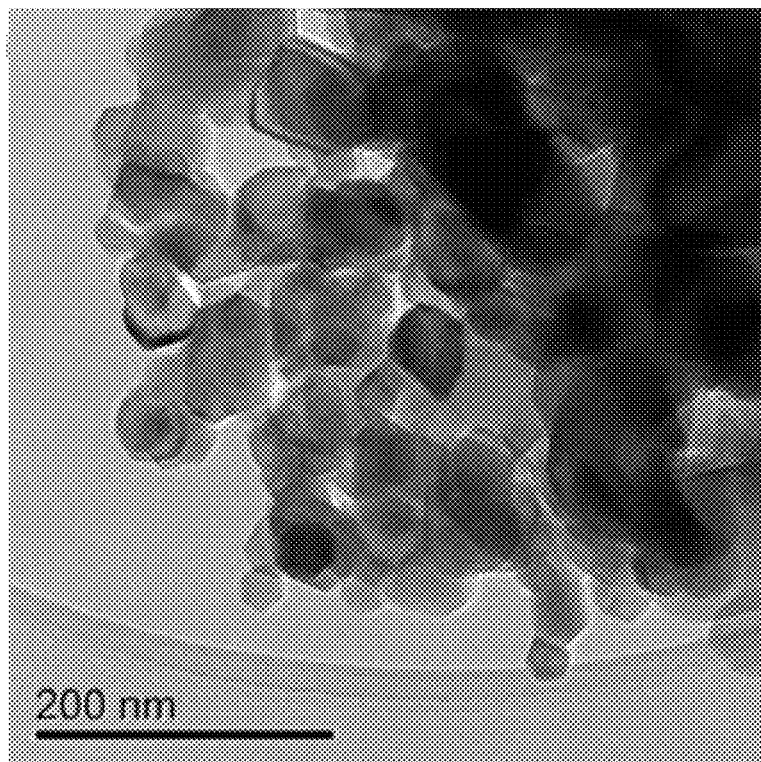
FIG. 2A shows a TEM image of the synthesized $CoFe_2O_4$—$BaTiO_3$ nanocomposite nanoparticles.
Figure 2B:
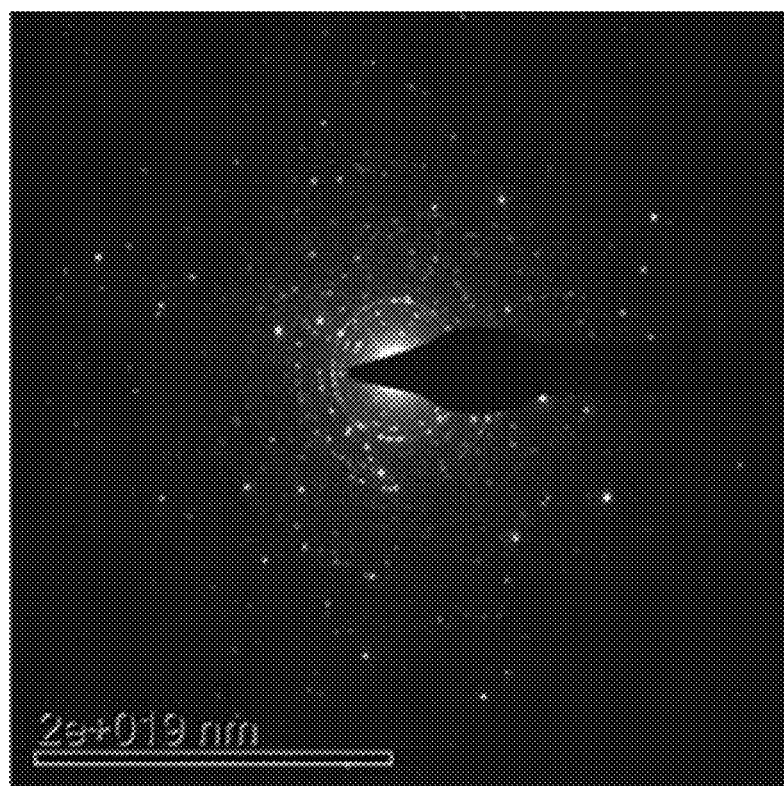
FIG. 2B shows a selected area electron diffraction pattern of the synthesized $CoFe_2O_4$—$BaTiO_3$ nanocomposite nanoparticles.

FIG. 2A shows the HRTEM of CoFe$_2$O$_4$—BaTiO$_3$ nanoparticles as-synthesized and shows the nanoparticles have a spherical shape. The selected area diffraction pattern is provided in FIG. 2B. The CoFe$_2$O$_4$ and BaTiO$_3$ nanoparticles displayed quasi-cubic and spherical shaped morphology respectively, each with well-defined boundaries. The selective area electron diffraction (SAED) patterns showed crystalline diffraction spot rings that correspond to the crystal planes. Analyzing the TEM images by using the Image J software, the particle sizes of BaTiO$_3$ and CoFe$_2$O$_4$ were measured. An average particle size was computed based on the Gaussian fitting of the sizes. The size of each was also measured from TEM Images taken from various sections of the sample for clarity. From this observation, respective particle sizes of BaTiO$_3$ and CoFe$_2$O$_4$ were found to be 102 and 48 nm.

Figure 3A:
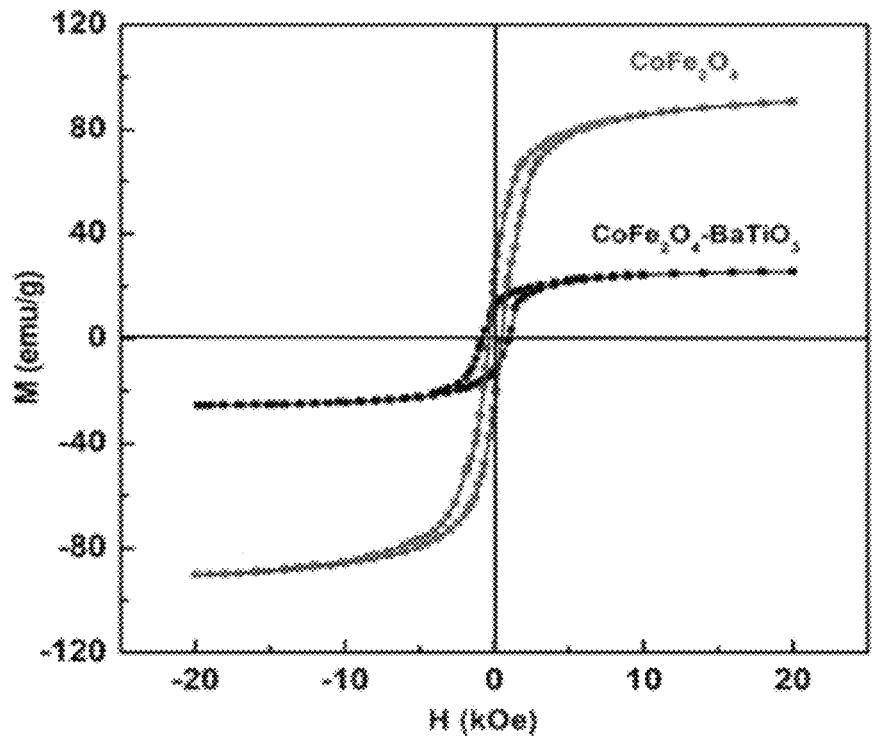
FIG. 3A shows saturation magnetization curve of synthesized $CoFe_2O_4$—$BaTiO_3$ and $CoFe_2O_4$ nanoparticles.

The BaTiO$_3$ and CoFe$_2$O$_4$—BaTiO$_3$ hybrid nanoparticles exhibited saturated magnetic hysteresis loops of ferromagnetic nature at ambient temperature are shown in FIG. 3A. The magnetic coercivity of the composites (1.1 kOe) was larger compared to that of $BaTiO_3$ (0,4 kOe). The as-produced $CoFe_2O_4$ nanoparticles had a saturation magnetization (Ms) of 90.77 emU/g, whereas the composite exhibited an Ms of 32 emU/g, The lowered saturation magnetization of $CoFe_2O_4$ is caused the presence of non-magnetic $BaTiO_3$ nanoparticles. Considering the saturation magnetization of $CoFe_2O_4$ as a benchmark, the weight percentage constituent phases present in the composite nano-particles can be calculated. From the magnetization sum rule, the amount of $CoFe_2O_4$ in the nanocomposite was found to be of the expected proportion of 35%.

Figure 3B:
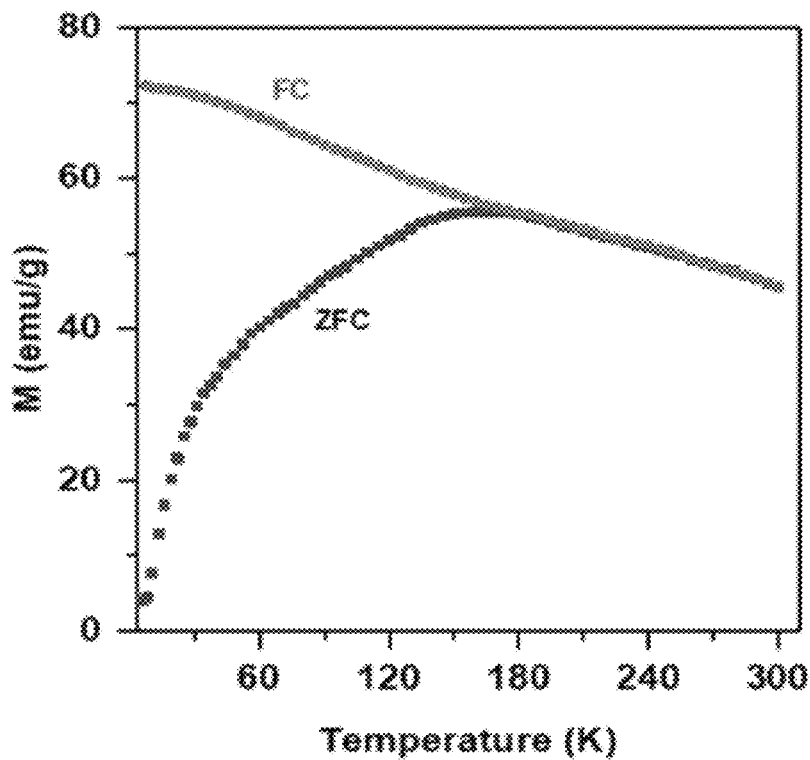
FIG. 3B-3C show ZFC and FC magnetization curves as a function of temperature at H=1 kOe for $CoFe_2O_4$ nanoparticles (FIG. 3B) and $CoFe_2O_4$—$BaTiO_3$ nanoparticles (FIG. 3C).
Figure 3C:
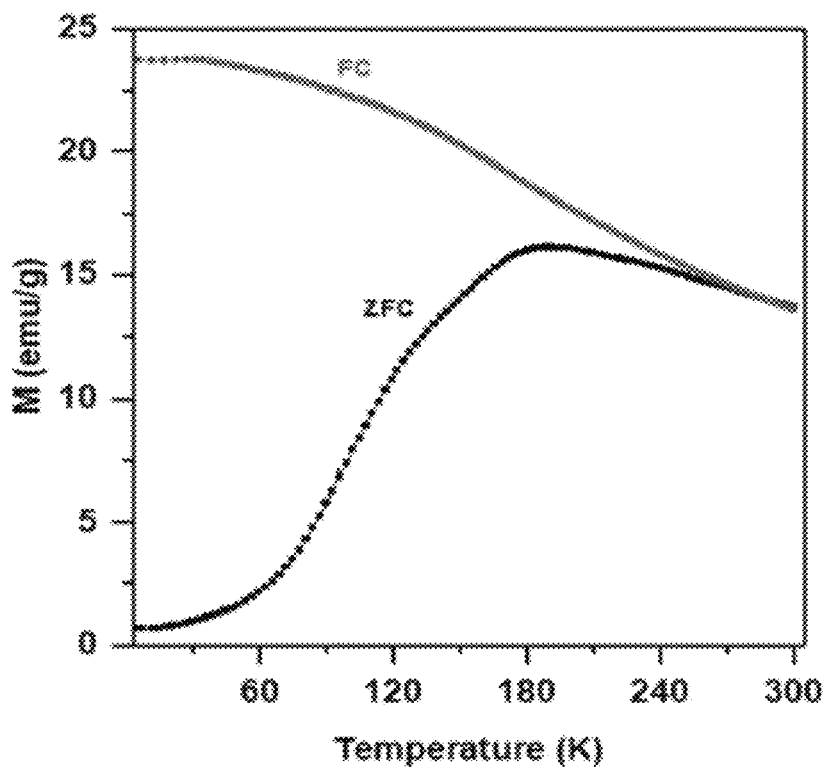

The magnetic properties were also investigated by determining the magnetization in both zero-field-cooled (ZFC) and field-cooled (FC) conditions at a 1 kOe magnetic field. The results are presented in FIGS. 3B and 3C. The magnetization of ZFC and FC modes indicates the superparamagnetic behavior wherein both curves merge at room temperature and then start to deviate significantly as the temperature is decreased. The ZFC magnetization of $CoFe_2O_4$ and composite samples presented maxima at a temperature known as the blocking temperature ($T_B$) where the thermal energy becomes comparable with the anisotropy energy and then started to decrease suddenly [Y. Melikhov, et. al., J. Appl. Phys., 99, 8, 2006, 08R102, incorporated herein by reference in its entirety]. The observed $T_B$ for $CrFe_2O_4$ and nanocomposites are 170 K and 193 K, respectively. The observation of different TB of present samples can be due to the changed in effective magnetic anisotropy with reference to their composition. The ZFC and FC magnetization was measured to understand the magnetic nature of the samples due to nano-size and to determine their single domain nature as well as blocking temperature. The effect of mixing non-magnetic $BaTiO_3$ on the magnetization was studied. In M-T relation, when $T<T_B$, the energy barriers can trap the particle's magnetization in two or more meta-stable orientations, while thermal energy overcomes the energy barriers to produce the well-known superparamagnetic regime under $T>T_B$. The nanocomposite of $CoFe_2O_4$—$BaTiO_3$ exhibited higher TB due to the change in effective magnetization as well as modified strain state due to lattice mismatch at the interface.

Preparation of Nanofluids

The $CoFe_2O_4$—$BaTiO_3$ nanoparticles were dispersed in ethylene glycol to create the stable CoFe204-$BaTiO_3$/ethylene glycol hybrid nanofluids. The nanofluids were prepared in the volume concentrations of 0.25%, 0.5%, 0.75%, and 1.0% by adding 89.77, 179.98, 270.66, and 361.89 g, into 7 L of ethylene glycol, respectively. The density of $CoFe_2O_4$ is 5230 kg/m³ and the density of $BaTiO_3$ is 6010 kg/m³, the density of$CoFe_2O_4$—$BaTiO_3$ was calculated based on the law of mixtures. From the magnetization sum rule analysis, the final nanocomposite contains 35% of $CoFe_2O_4$ and 65% of $BaTiO_3$, respectively. Based on this, the density of $CoFe_2O_4$—$BaTiO_3$ was calculated to be 5737 kg/m³.

From ZetaSizer nano 7.S from Malvern Instruments, stability was evaluated for the generated EG mixed $CoFe_2O_4$—$BaTiO_3$ nanofluids. To create homogeneous and stable hybrid nanofluids, 8 ml of 25% tetramethylammonium hydroxide (TMAH) was also utilized as a surfactant. The base fluid's surfactant exerts an attractive force on the nanoparticles, making them positively or negatively charged. For understanding, both the advantages and disadvantages of the findings are taken into account. Nanofluids were added to the instrument at volume loadings of 0.25%, 0.50%, 0.75%, and 1.0%. Zeta potential measurements were made at −42.1, −41.8, −41.1, and −39.8 mV in each case. The data show that as the nanoparticle loading increases, the zeta potential value decreases. The produced repulsive forces eventually weaken as particle loadings rise.

The thernophysical properties of $CoFe_2O_4$—$BaTiO_3$/EG hybrid nanofluids are necessary for determining the heat transfer coefficient and Nusselt number analysis, and they were examined experimentally. The thermal conductivity of a nanofluid ($k_{nf}$) was measured using a ICD2 Pro thermal property analyzer from Decagon Devices Inc. USA. The nanofluid viscosity was determined using the AND vibro-viscometer, Japan. It was determined what the nanofluid density was evaluated through Archimedes principle. The specific heat of the nanofluid was determined using a differential scanning calorimeter (DSC 2920 modified, TA Instruments, USA) equipment. All of the properties were measured in the temperature ranging from 20° C. to 60° C. and particle loadings ranging from 0.25 to 1.0% by volume.

Figure 4A:
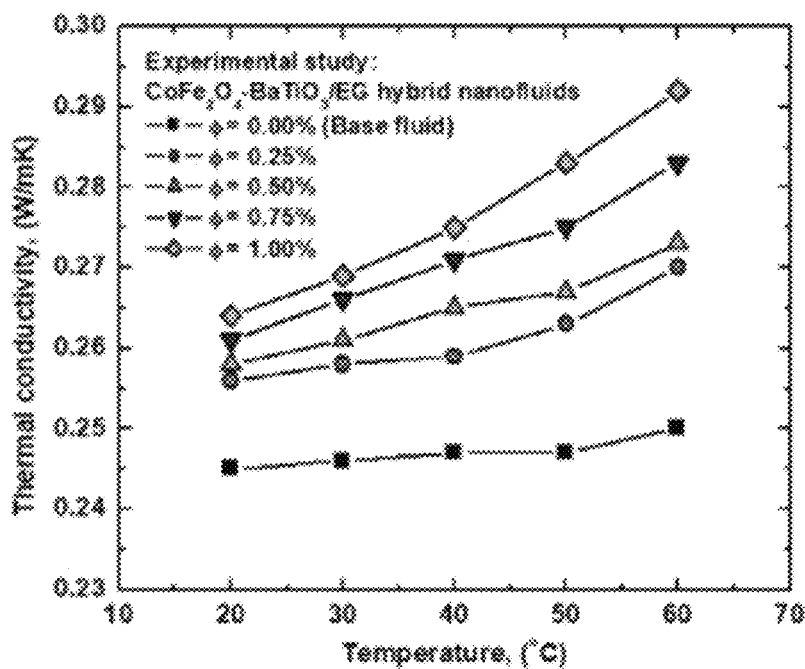
FIGS. 4A-4D show thermophysical properties of $CoFe_2O_4$-$BaTiO_3$/EG hybrid nanofluids, where
Figure 4B:
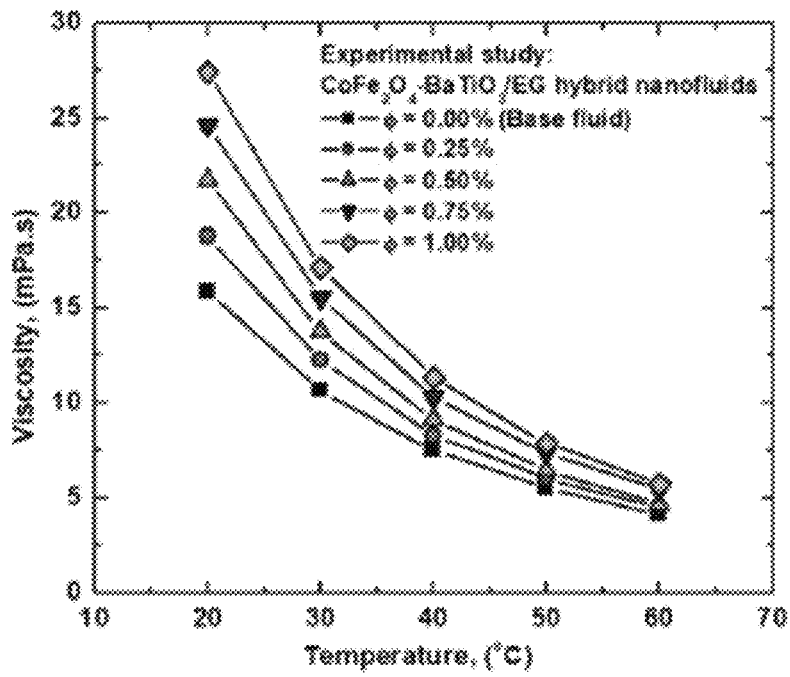

A rise in both temperature and loading enhances the nanofluid $k_{nf}$. In comparison to base fluid, a higher $k_{nf}$ of 7.76% and 16.8% was observed at 1.0% loading and at temperatures of 20° C. and 60° C., respectively in FIG. 4A. The increase in $k_{nf}$ was brought on by the formation of a Brownian motion and particle migration. However, the viscosity of nanofluid increase, whereas a rise in temperature causes the viscosity to decrease. At 1.0% loading and at temperature of 20° C. and 60° C., respectively, a maximum of 73% and 37.72% were observed In FIG. 4B, compared to EG fluid.

Figure 4C:
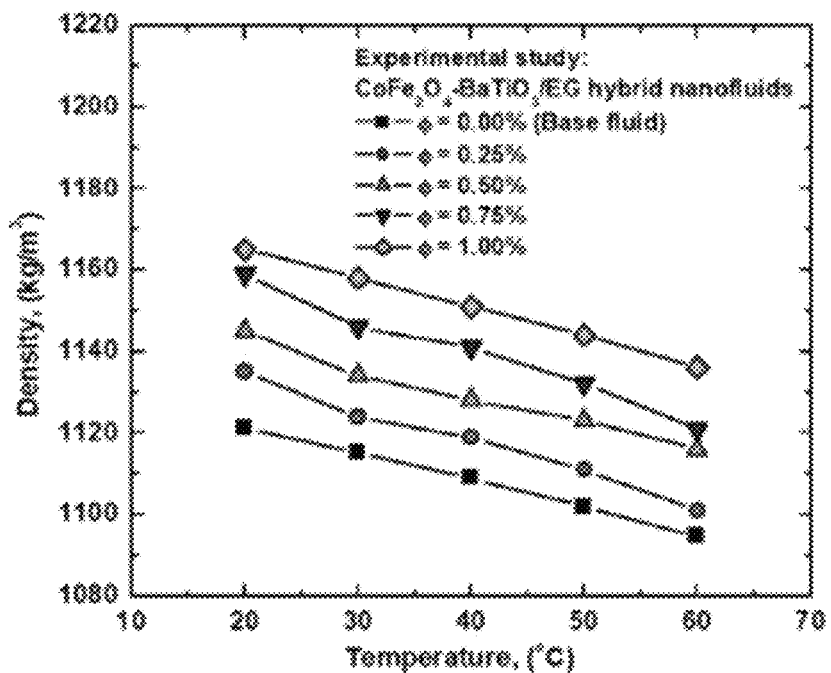
Figure 4D:
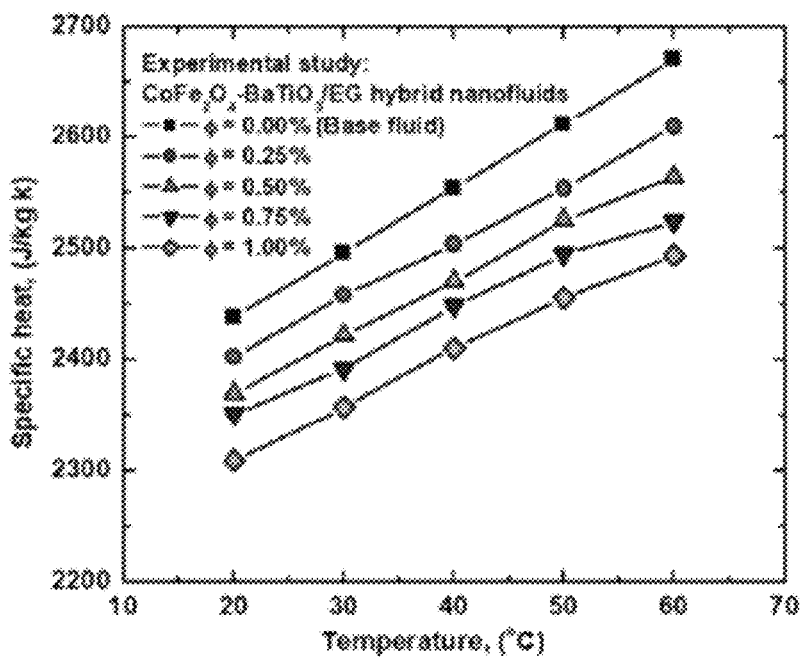

Additionally, the density was increased owing to an increase in loading, whereas it was decreased due to an increase in temperature. Over EG fluid, the maximum rise of 4.33% was seen at 1.0% and at a temperature of 60° C. were noted in FIG. 4C. The specific heat decreased concurrently augmented in volume loadings, and it was higher with respect to the rise in temperature. A moderate decrease in $C_p$ of 4.12% was seen in FIG. 4D at 1.0% vol of nanofluid. Table 2 lists the thermophysical characteristics that were measured through experimentation. The collected data was modeled in order to generate accurate thermophysical property values according to Formulas (1)-(4) below.

$$\text{Thermal conductivity: } k_{nf} = 0.23408 + 0.000406\ T + 0.02768\ \phi \quad (1)$$

$$\text{Absolute viscosity: } \mu_{nf} = 24.9612 - 0.40718\ T + 5.2032\ \phi \quad (2)$$

$$\text{Density: } \rho_{nf} = 1036.28 - 0.69514\ T + 47.19\ \phi \quad (3)$$

$$\text{Specific heat: } C_{p,nf} = 2324.52 + 6.296\ T - 93.76\ \phi \quad (4)$$

TABLE 2

Thermophysical properties of $CoFe_2O_4$-$BaTiO_3$/EG hybrid nanofluids.

| Property | T (° C.) | EG | φ = 0.25% | φ = 0.50% | φ = 0.75% | φ = 1.0% |
|---|---|---|---|---|---|---|
| $k_{nf}$ (W/mK) | 20 | 0.245 | 0.256 | 0.258 | 0.261 | 0.264 |
|  | 30 | 0.246 | 0.258 | 0.261 | 0.266 | 0.269 |
|  | 40 | 0.247 | 0.259 | 0.265 | 0.271 | 0.275 |
|  | 50 | 0.247 | 0.263 | 0.267 | 0.275 | 0.283 |
|  | 60 | 0.250 | 0.270 | 0.273 | 0.283 | 0.292 |
| μ (mPa · s) | 20 | 15.85 | 18.75 | 21.69 | 24.58 | 27.42 |
|  | 30 | 10.64 | 12.25 | 13.74 | 15.54 | 17.12 |
|  | 40 | 7.51 | 8.29 | 9.12 | 10.32 | 11.32 |
|  | 50 | 5.51 | 6.02 | 6.45 | 7.35 | 7.89 |
|  | 60 | 4.18 | 4.48 | 4.69 | 5.44 | 5.74 |

TABLE 2-continued

Thermophysical properties of $CoFe_2O_4$-$BaTiO_3$/EG hybrid nanofluids.

| Property | T (° C.) | EG | φ = 0.25% | φ = 0.50% | φ = 0.75% | φ = 1.0% |
|---|---|---|---|---|---|---|
| ρ (kg/m³) | 20 | 1121.23 | 1135 | 1147 | 1160 | 1169 |
| | 30 | 1115.3 | 1126 | 1139 | 1149 | 1162 |
| | 40 | 1108.89 | 1120 | 1132 | 1144 | 1156 |
| | 50 | 1101.99 | 1113 | 1126 | 1137 | 1149 |
| | 60 | 1094.6 | 1107 | 1118 | 1129 | 1142 |
| $C_p$ (J/kgK) | 20 | 2438 | 2436 | 2430 | 2384 | 2323 |
| | 30 | 2496 | 2501 | 2482 | 2432 | 2402 |
| | 40 | 2554 | 2564 | 2531 | 2523 | 2512 |
| | 50 | 2612 | 2658 | 2603 | 2565 | 2537 |
| | 60 | 2670 | 2723 | 2661 | 2602 | 2598 |

Equipment and Procedure

Figure 5A:
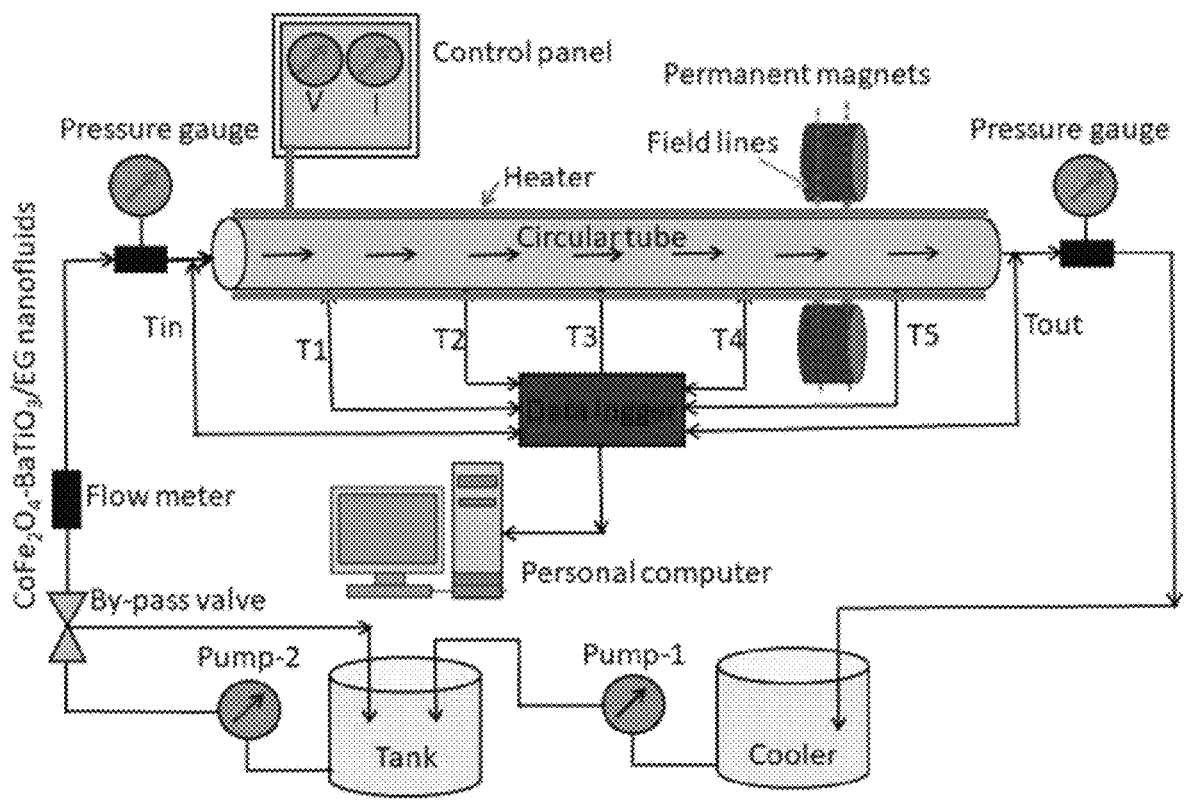
FIG. 5A shows a schematic diagram of the experimental setup.

FIG. 5A depicts a schematic representation of an experimental setup. The test tube is made of copper and has a length (l) of 1500 mm, an outer diameter (do) of 12 mm, and an inner diameter (di) of 10 mm. With the help of an AC pump, the $CoFe_2O_4$—$BaTiO_3$/EG nanofluid was circulated throughout the test tube. A nichrome heater was used to heat the test tube. The test tube was covered with the beater. J-type thermocouples were used to gauge the fluid's intake and outflow temperatures as well as its surface temperature. The thermocouples were positioned 187, 375, 750, 1125, and 1312 mm, on the tube outside edge.

The thermocouple needles were connected to a data logger. To keep the working fluid's output and inlet temperatures equal, the Julabo temperature controller bath (Germany) cooler is utilized for the nanofluid). The working fluid in the test part was circulated in a closed loop. With a flow meter, the hybrid nanofluids flow rates were measured.

Through the flexible pipes that connect the tank and tube, the working fluid was circulated. The by-pass valve configuration was utilized to reduce the working fluid's surplus flow rate it entered the test section. Due to the use of AC pump, the hybrid nanofluids were sent into the tube. In the 30 L tank, pure EG was initially used and later hybrid nanofluids were introduced. Next, the 500 W electrical energy and pump was switched on, and the test fluid allowed to circulate in the tube. The fluid input and temperature readings, well as the flow rates were recorded for additional heat transfer evaluation calculations after the system entered steady state (after around two hours). For varying $CoFe_2O_4$—$BaTiO_3$/EG nanofluid concentrations, the same process was performed.

The flow rates fixed for all the fluid flow in a tube is from 0.033 to 0.166 kg/s, but their corresponding Reynolds numbers (Re=4m/πdiµ) for EG is from 399.09 to 1995.43; for φ=0.25% nanofluid is from 346.6 to 1733.2; for φ=0.5% nanofluid is from 309.05 to 1545.23; for φ=0.75% nanofluid is from 273.18 to 1365.89; and for φ=1.0% nanofluid is from 248.03 to 1240.15, respectively.

Applying of Magnetic Field

Figure 5B:
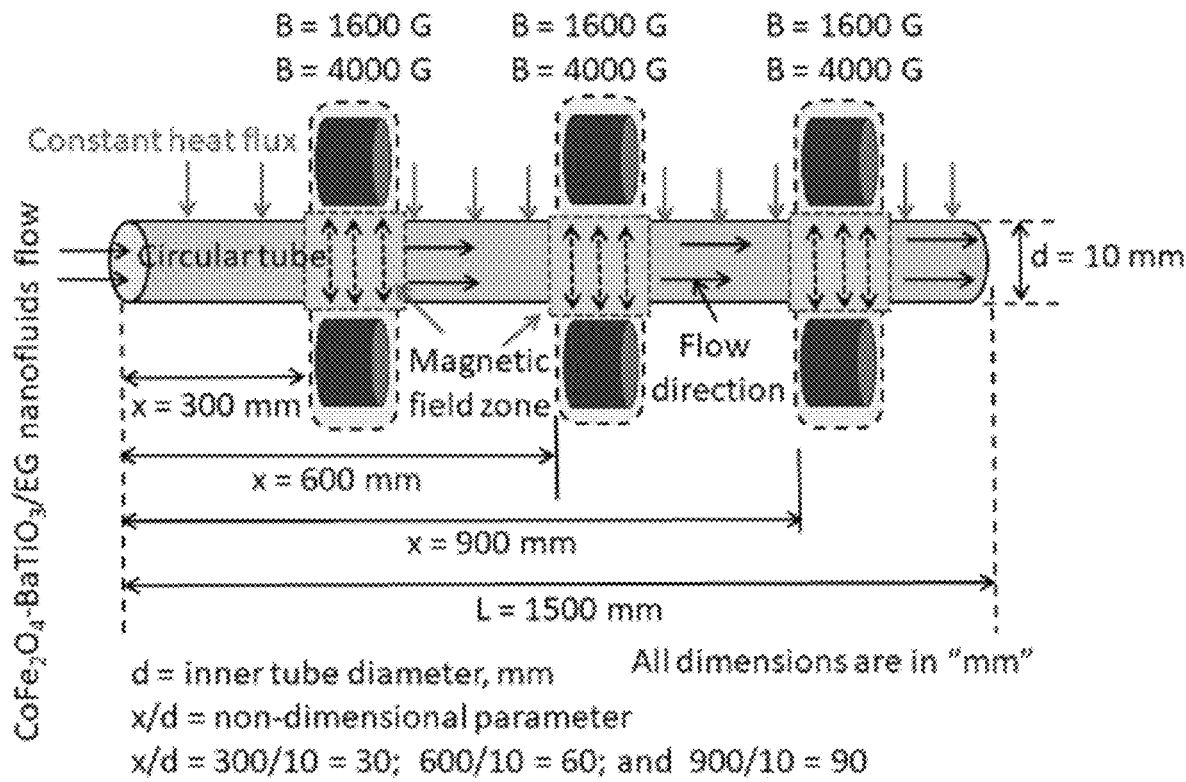
FIG. 5B shows the arrangement of permanent magnetics for the test tube.

The evaluation of the hybrid nanofluid uniform magnetic fields convective heat transfer capabilities under various location conditions was evaluated study. In order to apply the magnetic field to the $CoFe_2O_4$—$BaTiO_3$/EG hybrid nanofluid flow in tube permanent magnets were used. The magnetic field was applied at three different locations on the tube. From the left-side of the tube, at the locations 300 mm, 600 mm and 900 mm, the magnetic fields are applied. The two magnetic field intensities of 1600 G, and 4000G were applied on to the tube when the $CoFe_2O_4$—$BaTiO_3$/EG hybrid nanofluid flow in tube (FIG. 5B). The distance x was measured from the left-side of the tube. The distance (x) was converted into nondimensional form by dividing with tube inner diameter (di), because this parameter x/di is introduced in the developed Nusselt number regression equation. The magnetic field was produced by permanent magnets. A gauss meter was used to measure the induced magnetic field.

Nusselt Number (Nu) Analysis

The amount of heat supplied to the test tube and the heat absorbed by the test fluid was estimated from Formulas (5) and (6) and the deviation between them was found to be ±2.5% [L. Syam Sundar, N,T, Ravi Kumar, M,T, Naik, K,V. Sharma, Int. J. Heat Mass Transfer, 55, 11-12, 2012, 2761-2768; M.T. Naik, et. al., Int. Comm. Heat Mass Transfer, 46, 2013, 13-21, incorporated herein by reference in its entirety; and M.T. Naik, et. al., Heat Transfer Eng., 35, 1, 2014, 53-62, incorporated herein by reference in its entirety].

$$\text{Heat supplied } Q_h = VJ \quad (5)$$

$$\text{Heat absorbed } Q_a = mC_p(T_{out} - T_{in}) \quad (6)$$

$$\text{Average heat transfer } Q_{avg} = \frac{(Q_h + Q_a)}{2} \quad (7)$$

Based on the Newton's law of cooling, the convective heat transfer the coefficient of nanofluids with and without magnetic field was estimated using Formulas (8) and (9).

$$\text{Heat transfer coefficient } h = \frac{Q_{avg}}{A(T_{wall} - T_{bulk})} \quad (8)$$

where $$A = \pi DL; \; T_{wall} = \frac{T_1 + T_2 + T_3 + T_4 + T_5}{5};$$

and $$T_{bulk} = \frac{T_o + T_i}{2}.$$

$$\text{The Nusselt Number } Nu = \frac{h \times d}{k} \quad (9)$$

Friction Factor Analysis

Friction factor evaluation of nanofluids with and without magnetic field was performed using Formula (10).

$$f = \frac{\Delta P}{\left(\frac{L}{d_i}\right)\left(\frac{\rho v^2}{2}\right)} \quad (10)$$

The experiments were carried out under the conditions of laminar flow (248.03~Re 1995.43).

Nusselt Number of Nanofluids Without the Effect of Magnetic Fields

Figure 6A:
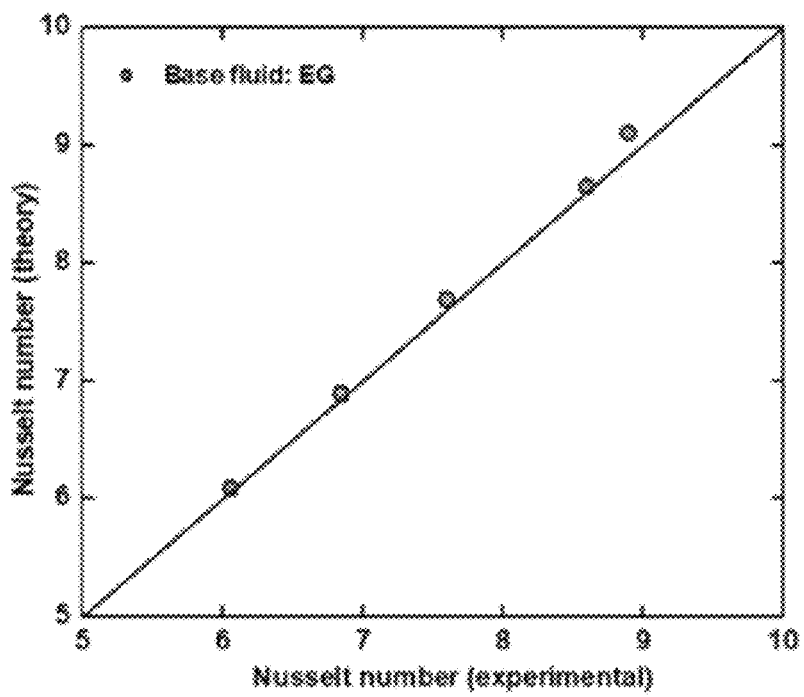
FIG. 6A shows a comparison of EG base fluid experimental Nusselt number with the predicted value.

Since the Reynolds number in each case is <2300, hence the laminar flow is considered. Below are the available laminar flow Nusselt number equations. The Nu validation was performed using the Sieder-Tate correlation shown in Formula (11) [E.N. Sieder, et. al., Ind. Eng. Chem., 28, 12, 1936, 1429-1435, incorporated herein by reference in its entirety]. The results are shown in FIG. 6A. The average error rates for the Nusselt number were found to be 5.7% based on data from experimental research.

$$\text{Sieder-Tate Equation } Nu = 1.86\left(RePr\frac{d}{l}\right)^{1/3}\left(\frac{\mu_b}{\mu_w}\right)^{0.14} \quad (11)$$

where Re<2300; 0.48<Pr<16700; 0.0044<$(\mu_b/\mu_w)$<9.15.

Figure 6B:
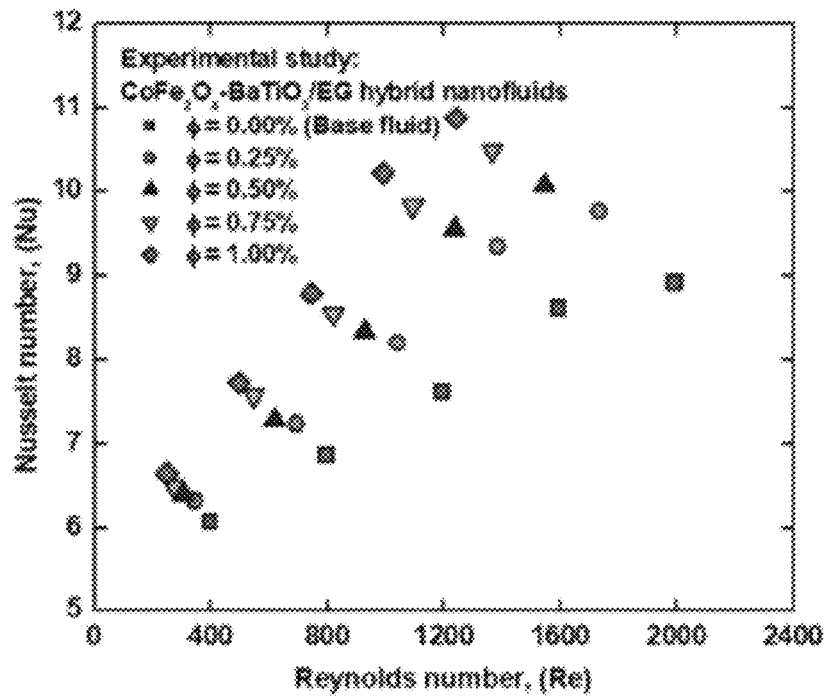
FIG. 6B shows a plot of the experimental Nusselt number of $CoFe_2O_4$—$BaTiO_3$/EG nanofluids.

The estimated Nusselt number from Formula (9) for the hybrid nanofluids are presented in FIG. 6B. For this case the magnetic field applied is zero. As it is seen with increased $\phi$ and Reynolds numbers, the Nusselt number is increased. The Nusselt number is increased about 4.15%, 5.47%, 7.12%, and 9.60% at 0.25%, 0.5%, 0.75%, and 1.0% vol. of hybrid nanofluids in the Reynolds number of 346.6, 309.05, 273.18, and 248.03, when validated with EG data. In the same way, the Nu is raised about 9.6%, 13.08%, 17.69% and 22.16% at 0.25%, 0.5%, 0.75%, and 1.0% of hybrid nanofluids in the Reynolds number of 1733.2, 1545.23, 1365.09, and 1240.15, when compared with water data. The higher $k_{nf}$ of nanofluid, as well as nanoparticle migration and Brownian motion are the likely causes of the hybrid nanofluids' increased Nusselt number.

Figure 6C:
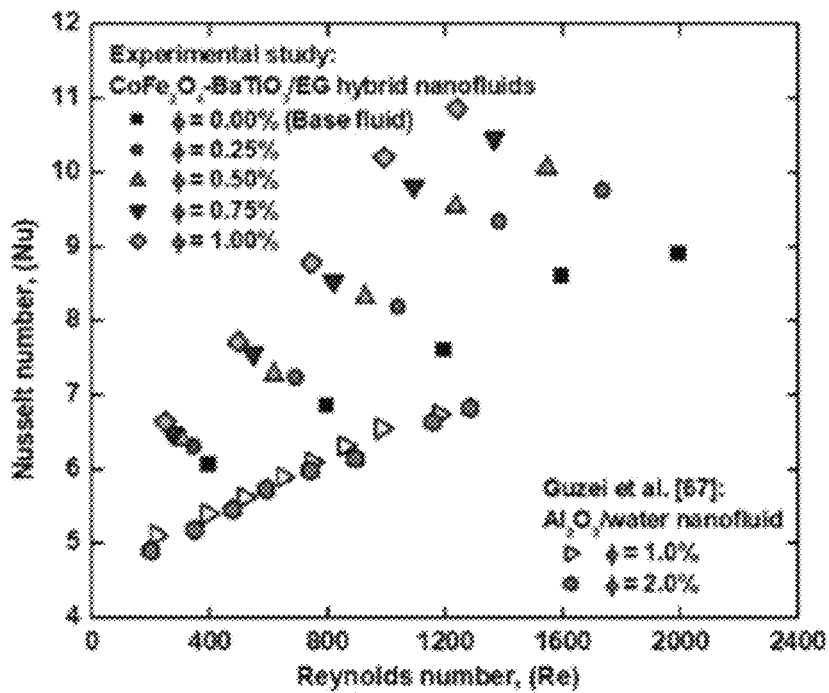
FIG. 6C shows a comparison of the experimental Nusselt number with D.V. Guzel, et. al., Int. J. Heat Mass Transfer, 139, 2019, 180-192.

Previous work on $Al_2O_3$/water and on Ag/water were taken used as comparisons to determine the trend of the current data because Nusselt number data for the case of $CoFe_2O_4$—$BaTiO_3$/EG nanofluids in laminar flow conditions were not available in the published literature [D.V. Guzel, et. al., Int. J. Heat Mass Transfer, 139, 2019, 180-192; S. Iyahraja, et. al., Heat Mass Transf. 55, 10, 2019, 3029-3039, incorporated herein by reference in its entirety]. Comparison of the current data and the data from Guzei et. al. is shown in FIG. 6C. The Nusselt number is larger for $CoFe_2O_4$—$BaTiO_3$/EG than $Al_2O_3$/water nanofluids, as is the general tendency in both cases. Additionally, the figure illustrates this, with the 1.0% volume of $CoFe_2O_4$—$BaTiO_3$/EG predicting 59.15% more than 1.0% volume of $Al_2O_3$/water nanofluid at a Reynolds number of 1240.15. The primary cause of the discrepancy between the present and literature Nusselt values is its thermal conductivity, which may be different based on the nanoparticle type.

Figure 6D:
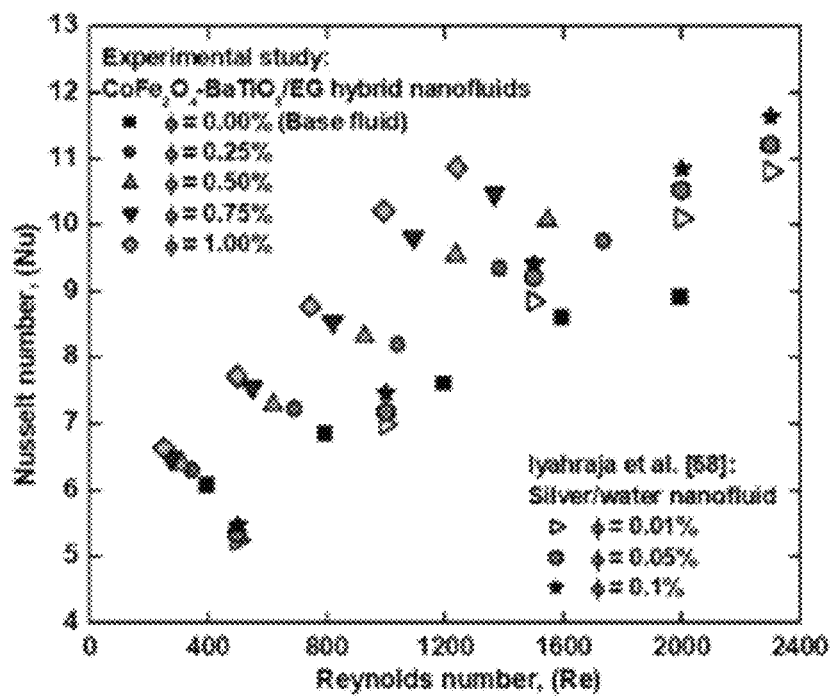
FIG. 6D shows a comparison of the experimental Nusselt number with S. Iyahraja, et. al., Heat Mass Transf. 55, 10, 2019, 3029-3039.

A comparison of the current data to those of Iyahraja et. al. is shown in FIG. 6D. As is the case in both circumstances, $CoFe_2O_4$—$BaTiO_3$/EG nanofluids have a larger Nusselt number than silver/water nanofluids. This is also shown in the graph, which shows that at a Reynolds number of 1500, the current data of 1.0% vol. of $CoFe_2O_4$—$BaTiO_3$/EG was 15.39% greater than 0.1% vol. of silver/water nanofluid. The Nusselt number enhancements between experimental and published data are likely due to the nanoparticle type and thermal conductivity differences.

Nusselt Number of Nanofluids With an Effect of Magnetic Fields

Figure 7A:
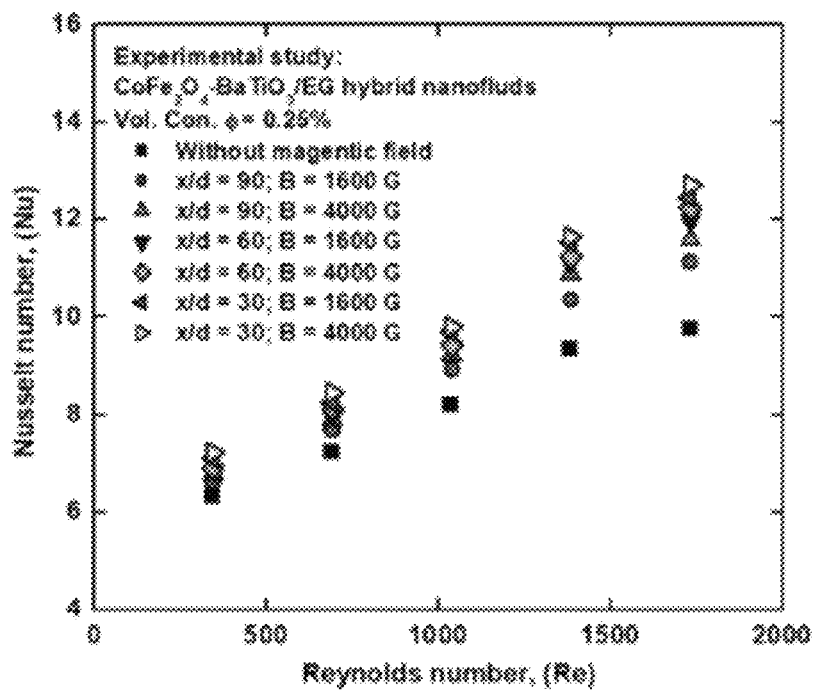
FIGS. 7A-7D show plots of the Nusselt number vs Reynolds number of $CoFe_2O_4$—$BaTiO_3$/EG nanofluids at various magnetic field strengths and distances, with FIG. 7A being for a nanofluid having $\phi$=0.25%, FIG. 7B being for a nanofluid having $\phi$=0.5%, FIG. 7C being for a nanofluid having $\phi$=0.75%, and FIG. 7D being for a nanofluid having $\phi$=1.0%.

The surface of the tube was exposed to magnetic fields of 0 G, 1600 G, and 4000 G, respectively, at locations of x/d of 30, 60 and 90. It can be observed from the $\phi$=0.25% vol. loading of hybrid nanofluid with magnetic field in FIG. 7A that greater Reynolds numbers and higher magnetic fields result in larger Nusselt number values. Hybrid magnetic nanofluids being drawn to the tube surface at the region of the applied magnetic field can be used to explain how the Nu is enhanced.

As a result, the heat transfer rate is increased and the temperature differential between the surface and bulk fluids diminishes. The above mechanisms have been described by numerous publications [M. Sheikholeslami, et. al., Alex. Eng. J., 57, 2018, 565-575, incorporated herein by reference in its entirety; [P. Jalili, A.A. Azar, B. Jalili, Z. Asadi, D.D. Ganji, Case Stud. Thermal Eng., 40, 2022, 102524, incorporated herein by reference in its entirety; and P. Jalili, A.S. Ghahare, B. Jalili, D.D. Ganji, SN, Article number: 95, Appl. Sci., 5, 2023, incorporated herein by reference in its entirety]. As the magnetic field increases, the intensity of this force also increases, since all of the nanofluids exhibit magnetic behavior when the magnetic nanoparticles are diluted into the base fluid (EG) at particle volume loadings of 0.25%, 0.50%, 0.75%, and 1.0%. Initially, magnetic fields of 0 G, 1600 G, and 4000 G were investigated, and 0.25% vol. of nanofluid was supplied into the tube; however, the mass flow rates (m) for both applied magnetic fields were preserved at 0.033, 0.066, 0,1, 0,13, and 0,166 kg/s.

The magnetic nanofluids exhibited a higher Nusselt number in the presence of a stronger magnetic field. The Nu was increased by 14.58% at a Re of 346.6 and at 0.25% vol. of nanofluid with a magnetic field strength of 4000 G applied at a location of x/d of 30, against no field applied. The Nu was increased by 9.51% at a of 346.6 and at 0.25% vol. of nanofluid with a magnetic field strength of 4000 G applied at a location of x/d of 60 against no filed applied. The Nu was increased by 7 0.45% at a & of 346.6 and at 0.25% vol. of nanofluid with a magnetic field strength of 4000 G applied at a location of x/d of 90 against no field applied. On the other hand, the Nu Is increased by 30.15%, 25.44%, and 18.76%, respectively, compared to when there is no magnetic field, at a Re of 1733.2 and at 0.25% vol. of nanofluid with a applied magnetic field intensity of 4000 G at locations of x/d of 30, 60, and 90, respectively.

Figure 7B:
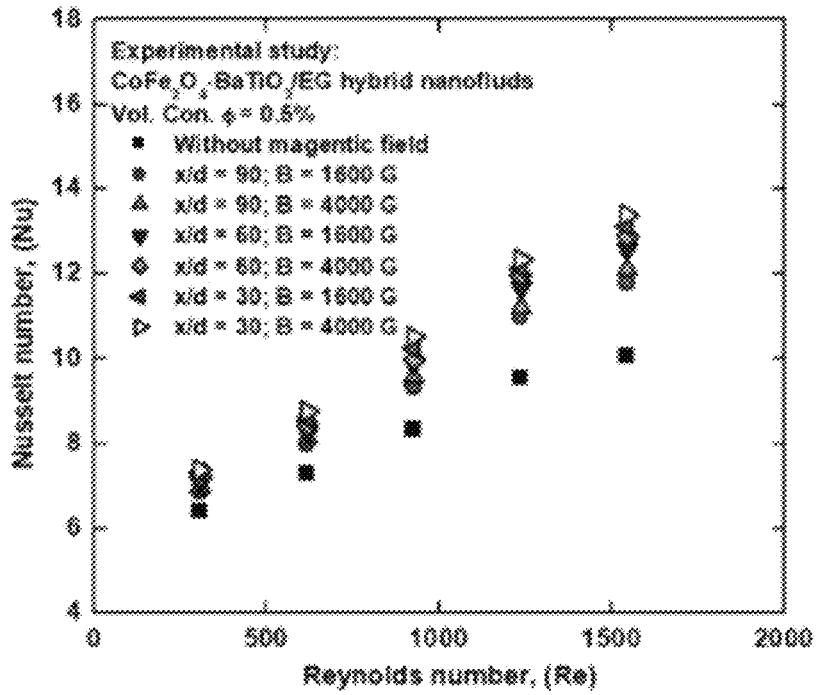

The Nusselt number of nanofluid with a value of 0.5% is shown in FIG. 7B for various magnetic field strengths and locations. The Nu was increased by 15.65% at a Re of 309.5 and at 0.5% vol. of nanofluid with applied magnetic field intensity of 4000 G at a location of x/d of 30 in comparison with no field applied. Additionally, the Nu was increased by 13.15% at a Re of 309.5 and at 0.5% vol. of nanofluid with applied magnetic field intensity of 4000 G, at a location of x/d of 60 compared with no field applied. The Nu was increased by 9.39% at a Re of 309.05 and at 0.5% vol. of nanofluid with applied magnetic field intensity of 4000 G at a location of x/d of 90 compared to when no field is applied. On the other hand, the Nu was higher by 33.10%, 28.13%, and 20.48%, respectively, compared to without a magnetic field, at a Re of 1545.23 and at 0.5% vol of nanofluid with applied magnetic field intensity of 4000 G at locations of x/d=90, 60 and 30, respectively.

Figure 7C:
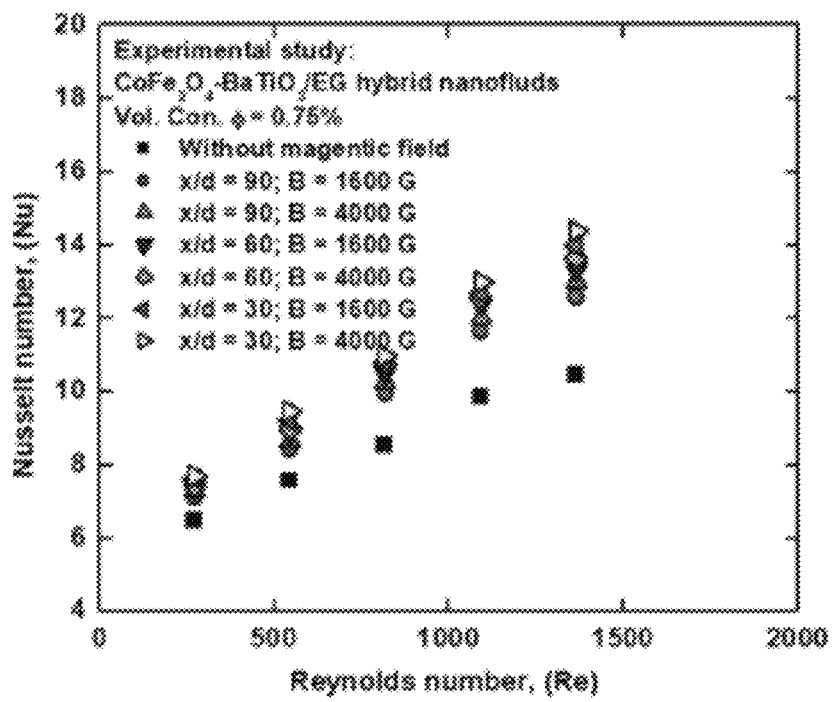

The hybrid nanofluid Nusselt number at 0.75% vol. is shown in FIG. 7C at various magnetic field strengths and locations. The Nu was increased to 18.80% at a Re of 273.18 for 0.75% vol of nanofluid with applied magnetic field intensity of 4000 G, and at a location of x/d of 30, compared to no magnetic field. The Nu was increased to 14.33% at a Re of 273.18 at 0.75% vol. of nanofluid with applied magnetic field intensity of 4000 G, and at a location of x/d of 60, as compared to no magnetic field. The Nu was increased to 12.33% at a Re of 273.18 at 0.75% vol. of nanofluid with applied magnetic field intensity of 4000 G, and at a location of x/d of 90 compared to without a magnetic field. The Nu was increased by 37.44%, 30.56%, and 23.97%, respectively, compared to when there is no magnetic field, at a Reynolds number of 1365.89, at 0.75% vol. of hybrid nanofluid flow in a tube, at an applied magnetic field strength of 4000 G, and at a location of x/d of 30, 60, and 90.

Figure 7D:
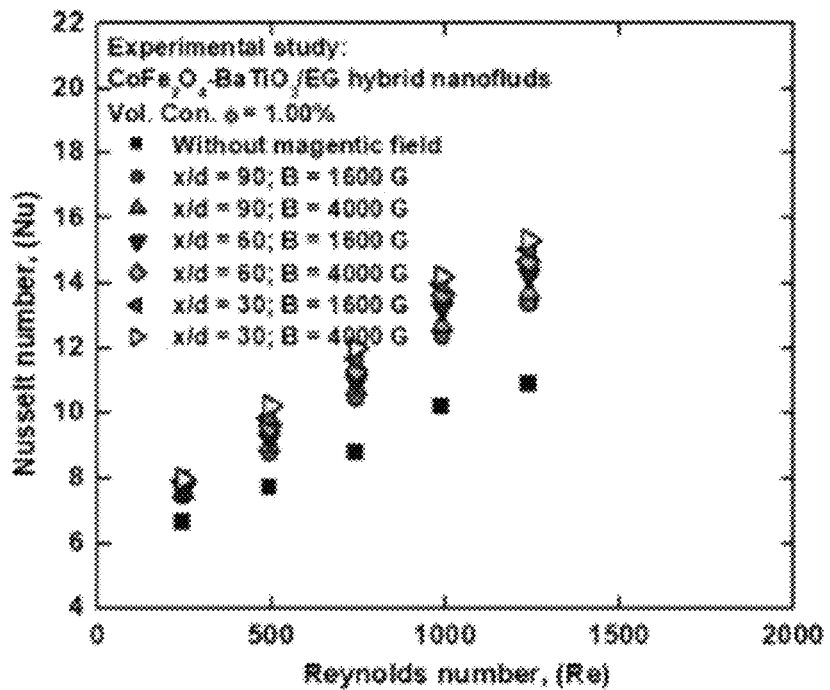

The Nu of hybrid nanofluid with a volume faction of 1.0% is plotted in FIG. 7D for various magnetic fields and locations. The Nu rose to 20.33% at a Re of 248.03 for 1.0% vol. of nanofluid flow in a tube with applied magnetic field intensity of 4000 G, and at a location of x/d of 30, compared to without magnetic field. The Nu was increased to 18.83% at a Re of 248.03 at 1.0% vol. of nanofluid with applied magnetic field intensity of 4000 G, and at a location of x/d of 60 compared to without magnetic field data. The Nu was increased to 14.31% at a Re of 248.03 at 1.0% vol. of hybrid nanofluid flow in a tube and at an applied magnetic field intensity of 4000 G, as compared to without a magnetic field, at a point of x/d of 90. The Nu was increased by 41.03%, 35.14%, and 25.94%, respectively, compared to when no magnetic field was applied, at a Re of 1240.15 and at 1.0% vol. of hybrid nanofluid flow in a tube and at an applied magnetic field intensity of 4000 G and at a location of x/d of 30, 60, and 90, respectively.

The placement of the magnetic field can have a significant impact on the convective heat transfer rate [H. Jafari and M. Goharkhah, Int. J. Thermal Sci., 157, 2020, 106495, incorporated herein by reference in its entirety]. Higher Nu values have been seen in areas with closer magnetic fields to the inlet portion than in sites farther from the inlet, these results are consistent with that work. Because the thermal boundary layer forms at point x/d of 30, its thickness is smaller and its thermal resistance is lower, which explains why this place has the highest Nusselt number. As a result, the fluid temperature and tube surface temperature are not equal at this site, and the magnetic field-induced Lorentz force causes a dramatic decrease in surface temperature [M. Sheikholeslami, et. al., Alexandria Eng. J., 56, 2, 2017, 277-283, incorporated herein by reference in its entirety]. As a result, at the point of x/d of 30, a greater local Nu was obtained. At a x/d of 60 and 90, the fluid temperature and tube surface temperature were found to have approached thermal quasi-equilibrium conditions, suggesting that the magnetic field had less of an impact there.

The obtained Nusselt number of hybrid nanofluids with and without applied magnetic field is fitted using a regression form as given in Formula (12) below.

$$\text{Nuaf}(Re, Pr, \phi, B, x/d) \tag{12}$$

By releasing lhe proportionality limit in the above equation $$Nu = CRe^a Pr^b \phi^c B^d (x/d)^e \tag{13}$$

In order to predict the plain base fluid data, $\phi$, B, and x/d are replaced with $1+\phi$, $1+B$, and $1+x/d$, then the above equation becomes:

$$Nu = CRe^a Pr^b (1+\phi)^c \left(1 + \frac{\vec{B}_{max}}{\vec{B}_{min}}\right)^d (1 + x/d)^e \tag{14}$$

Through the FOTRAN program, the constant and exponents are obtained and Formula (14) becomes Formula (15).

$$Nu = 0.5762 Re^{0.3572} Pr^{0.01181} (1+\phi)^{0.5606} \left(1 + \frac{\vec{B}_{max}}{\vec{B}_{min}}\right)^{0.5008} (1 + x/d)^{-0.05119} \tag{15}$$

$$248.03 \leq Re \leq 1995.43; 81.47 \leq Pr \leq 148.42;$$

$$0 \leq \phi \leq 1\%; 0 \leq x/d \leq 90; \vec{B}_{max} = 4000G; \vec{B}_{min} = 1600G$$

Figure 8:
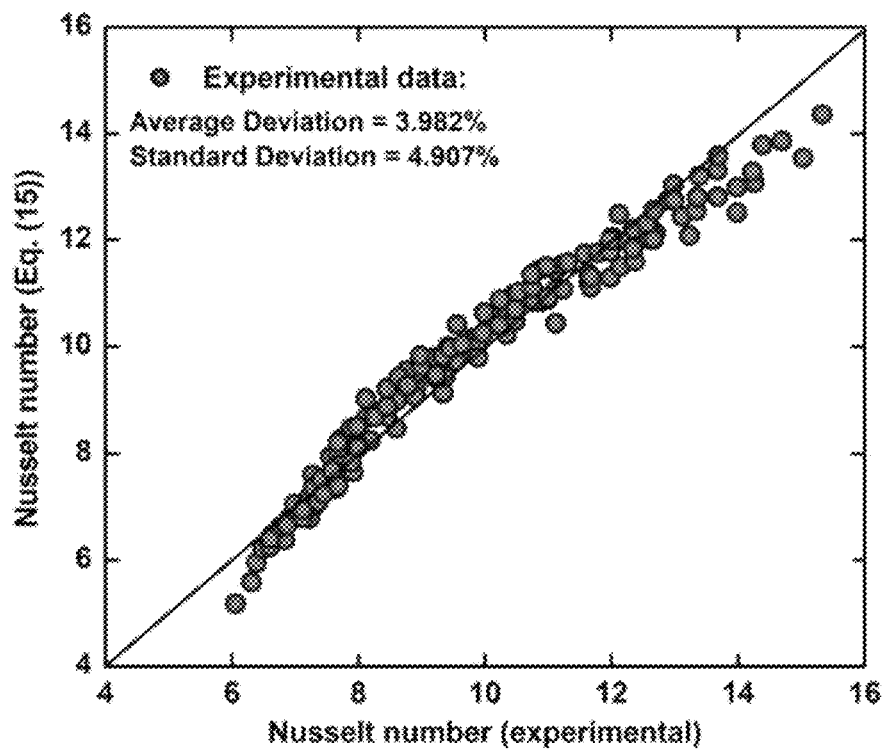
FIG. 8 shows the experimental Nusselt number versus the calculated value from Formula (15).

The values obtained from Formula (15) are shown in FIG. 8 along with experimental data.

Friction Factor of Nanofluids Without the Effect of Magnetic Field

Figure 9A:
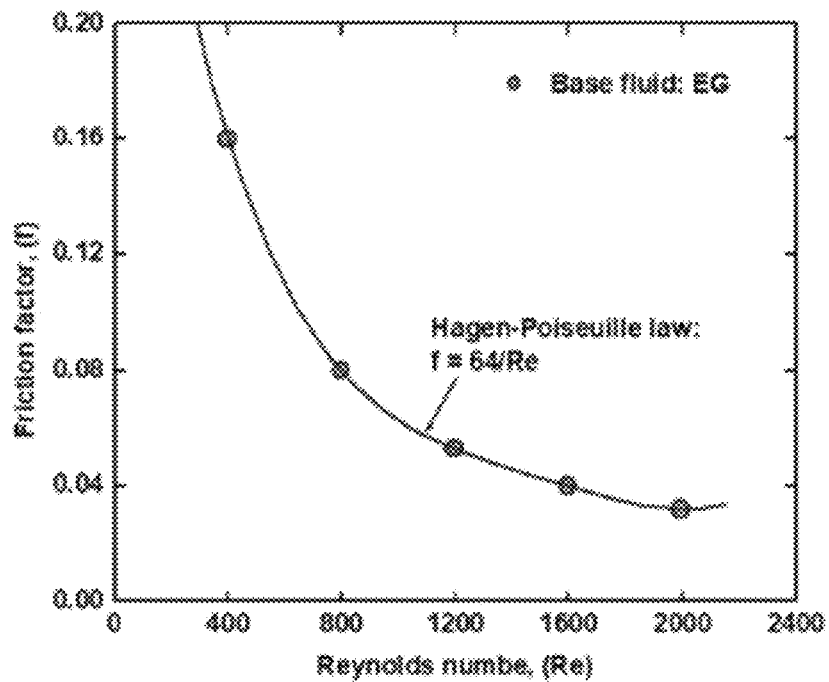
FIG. 9A shows a plot of a comparison of the calculated value and experimentally determined values of the base fluid friction factor.

First, the base fluid (EG) friction factor was determined. Since the Reynolds number in each case was Re<2300, the fluid is in laminar flow. Friction factor validation was performed using Hagen-Poiseuille correlation (formula (16) below), and the results are shown in FIG. 9A [F.P. Incropera and D.P. Dewitt, Introduction to Heat Transfer, 3rd ed., John Wiley & Sons, Inc., New York, USA, 1966, incorporated herein by reference in its entirety]. The average error rates for the friction factor have been found to be 4.5%.

$$\text{Hagen-Poiseuille correlation: } f = \frac{64}{Re} \tag{16}$$

Figure 9B:
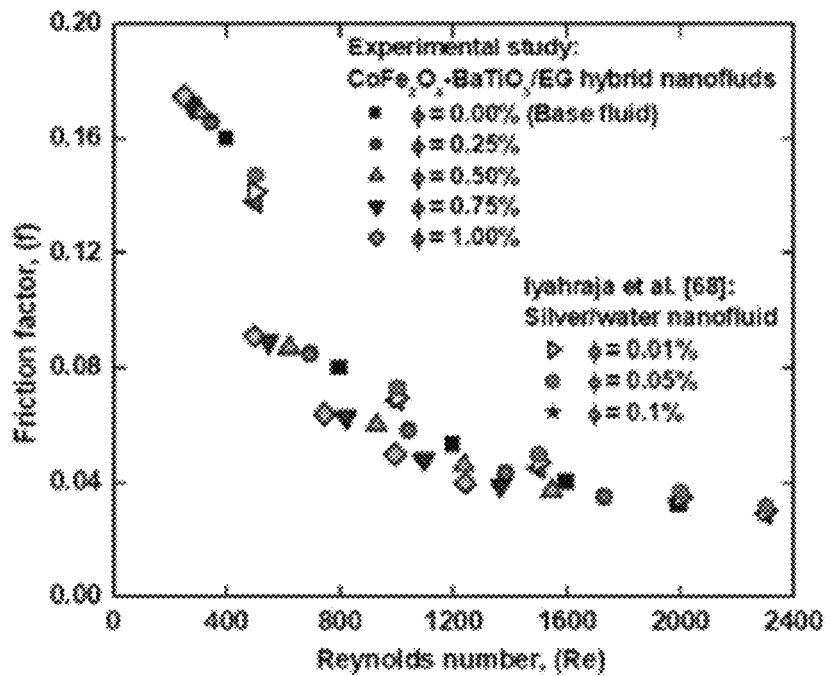
FIG. 9B shows a comparison of the experimentally determined friction factors in this work with S. Iyahraja, et. al., Heat Mass Transf. 55, 10, 2019, 3029-3039.

FIG. 9B displays the calculated friction factor for the hybrid nanofluids based on Formula (10). The applied magnetic field in this instance was zero. As can be observed from the figure, the friction factor increases with increasing particle volume loadings while it decreases with increasing Reynolds number. When validated with EG data, the friction factor was enhanced by approximately 3.75%, 5.63%, 7.50%, and 9.37% at 0.25%, 0.75%, 0.75%, and 1.0% of hybrid nanofluids at Reynolds numbers of 346.6, 309.05, 273.18, and 248.03. Similar to this when comparing data for hybrid nanofluids with Re of 1733.2, 1545.23, 1365.09, and 1240.15 to data for base fluid, the friction factor was increased by approximately by 9.38%, 15.63%, 21.88%, and 25% at 0.25%, 0.5%, 0.75% and 1.0%, respectively. The increased resistance between the two fluid layers is likely what causes the friction factor for hybrid nanofluids to increase. The viscosity of the hybrid nanofluids was increased with an increase of particle volume loadings. When the nanoparticles are uniformly dispersed in the base fluid (EG), the resistance between the fluid layers are increased because in the fluid layer, the Brownian motion of the nanoparticles in the base fluid will crease a small amount of fluid resistance This additional resistance will cause an increase of viscosity of the base fluid. The increased viscosity causes an increase in the friction factor.

Comparing with the Ag/water samples of Iyahraja et. al., the current data and the data from Iyahraja et. al. is shown in FIG. 9B. The friction factor trend for $CoFe_2O_4$—$BaTiO_3$/EG is almost identical to that of Ag/water nanofluids, as can be seen from the trend in both cases. The figure clearly illustrates this, with the 1.0% vol. of $CoFe_2O_4$—$BaTiO_3$/EG predicted value at a Reynolds number of 1240.15 being 24.5% lower than 0.1% of Ag/water nanofluid. The primary source of the varied friction factor between the current and literature values may be the type and size of the nanoparticle.

Friction Factor of Nanofluids With an Effect of Magnetic Fields

Figure 10A:
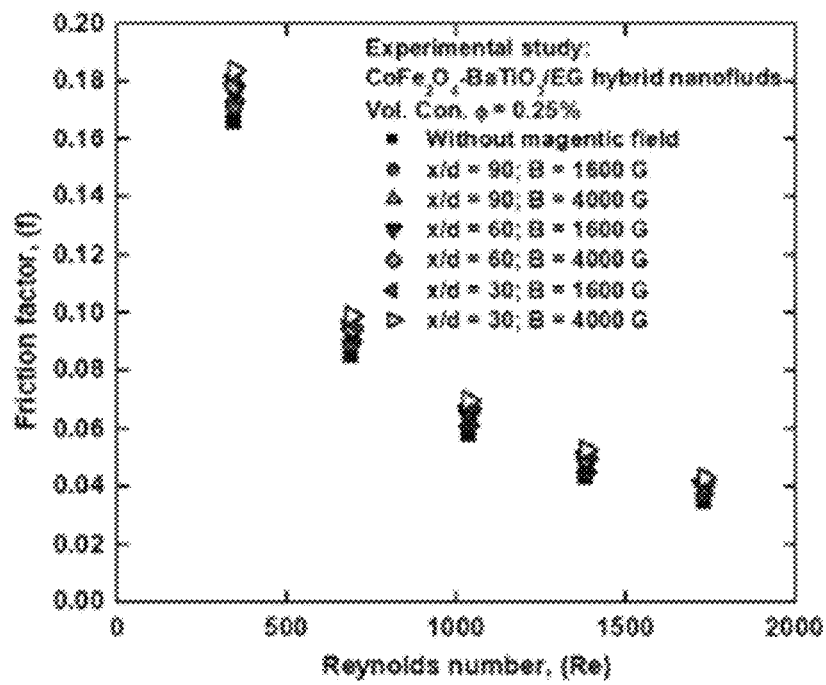
FIGS. 10A-10D show plots of the friction factor of $CoFe_2O_4$—$BaTiO_3$/EG nanofluids at various magnetic field strengths and distances, with FIG. 10A being for a nanofluid having $\phi$=0.25%, FIG. 10B being for a nanofluid having $\phi$=0.5%, FIG. 10C being for a nanofluid having $\phi$=0.75%, and FIG. 10D being for a nanofluid having $\phi$=1.0%.

At x/d of 30, 60, and 90, respectively, magnetic fields of 0 G, 1600 G, and 4000 G were applied to the tube surface. It can be observed from the investigation of the 0.25% vol. loading of hybrid nanofluid with magnetic field in FIG. 10A that lower Reynolds numbers and higher magnetic fields result in larger friction factor values. Hybrid magnetic nanofluids being drawn to the tube surface at the region of the applied magnetic field can account for the increase in friction factor.

Additionally, the flow restriction caused by the Kelvin force is another cause of the friction factor increase. As the magnetic field rises, the strength of this force grows as well. By resisting the flow, the Kelvin force lowers the nanofluid velocity and causes an increase in the friction factor. All of the nanofluids exhibit magnetic behavior as a result of the addition of magnetic nanoparticles to the base fluid (EG) at particle volume loadings of 0.25, 0.50, 0.75, and 1.0%. Initially, magnetic fields of 0 G, 1600 G, and 4000 G were used, and 0.25% vol. of nanofluid was applied; however, the mass flow rates for both applied magnetic fields were preserved at 0.033, 0.066, 0.1, 0,13, and 0.166 kg/s. The magnetic nanofluids exhibited a higher friction factor in the presence of a stronger magnetic field. The friction factor was increased by 10.84% at a Re of 346.6 when hybrid nanofluid had $\phi$=0.25% vol., at an applied magnetic field strength of 4000 G and position of x/d of 30, compared to no magnetic field. Additionally, the magnetic nanofluids exhibited a larger friction factor under the stronger magnetic field. The friction factor was larger by 7.83% at a Re of 346.6 at at 0.25% vol., with an applied magnetic field strength of 4000 G, and a position of x/d of 60. At x/d of 90, a 4000 G applied magnetic field, a loading of 0.25% vol., and a Re of 346.6, the friction factor was increased by 5.42% in comparison to no magnetic field. At a Reynolds number of 1733.2 and at $\phi$=0.25% vol. with applied magnetic field strength of 4000 G and at locations of x/d=30, 60, and 90, the friction factor was increased by 22.83%, 17.14%, and 11.43%, compared to without magnetic field.

Figure 10B:
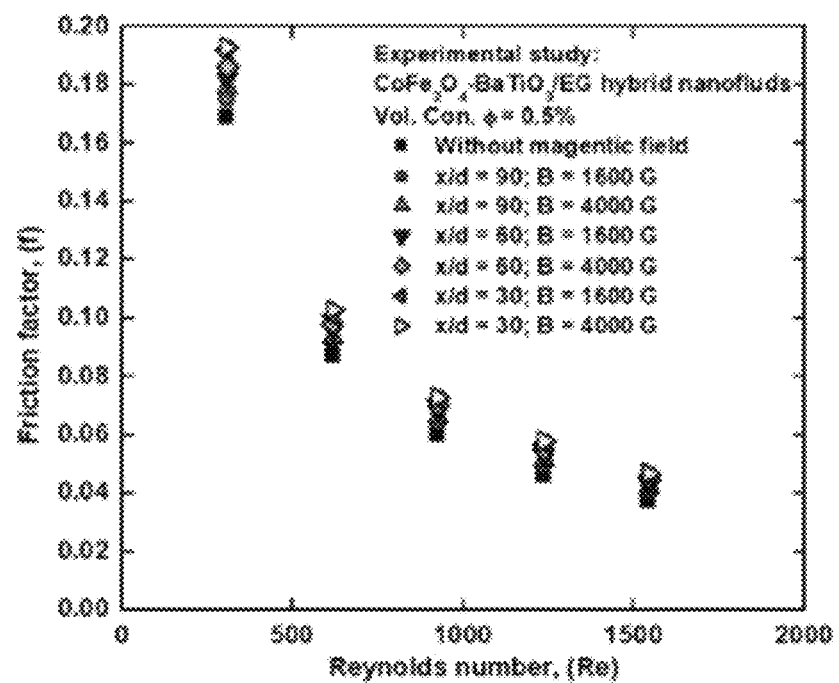

The friction factor of a hybrid nanofluid with a volume fraction of 0.5% is shown in FIG. 10B for various magnetic fields and locations. The friction factor was increased by 14.20% at a Re of 309.5 with applied magnetic field of 4000 G, and at a location of x/d of 30, compared to without magnetic field. The friction factor increased by 10.06% at a Re of 309.5 with applied magnetic field intensity of 4000 G and at a location of x/d of 60, compared to without magnetic field data. At x/d of 90, a 4000 G applied magnetic field, $\phi$=0.5% vol., and a Re of 309.05, the friction factor was increased to 5.92% compared to no magnetic field. The friction factor was increased by 27.03%, 21.62%, and 13.51%, respectively, in comparison to no magnetic field, at a Reynolds number of 1545.23 and $\phi$=0.5% vol. in a tube and at an applied magnetic field intensity of 4000 G.

Figure 10C:
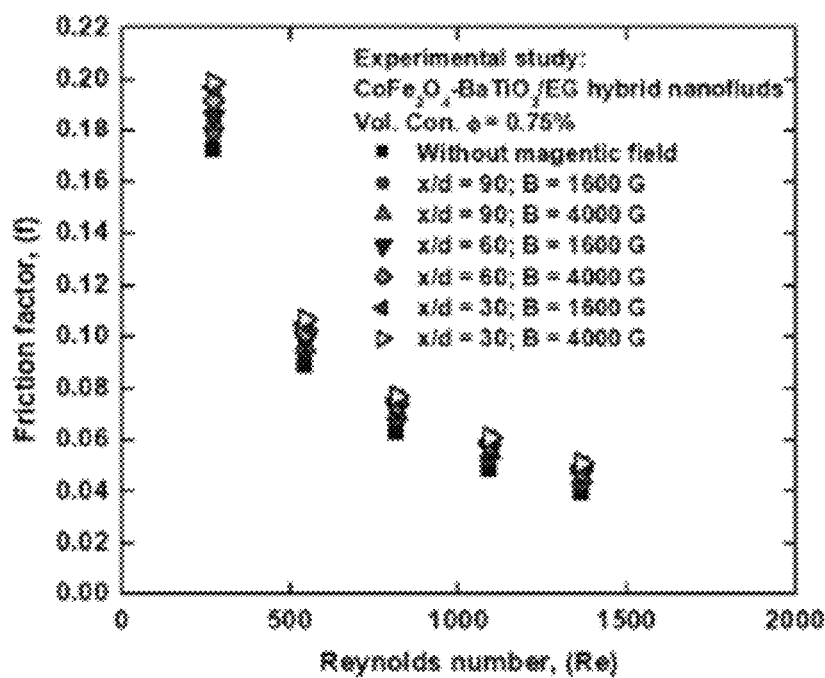

FIG. 10C show the friction factor for nanofluids having $\phi$=0.75% vol. at different magnetic fields and at locations. At a applied magnetic field strength of 4000 G, and at a distance of x/d of 30, the friction factor was increased by 185.70% at a Re of 273.18, compared to without magnetic field. With an applied magnetic field strength of 4000 G and at a location of x/d of 60, the friction factor was increased by 11.63% at a Re of 273.18, against without magnetic field. With an applied magnetic field strength of 4000 G and at a location of x/d=90, the friction factor was increased by 6.40% at a Re of 273.18, compared to without magnetic field. At a Re of 1365.89 and with an applied magnetic field strength of 4000 G and at a location of x/d of 30, 60, and 90, the friction factor was increased by 30.77%, 23.08%, and 15.38%, compared to without magnetic field.

Figure 10D:
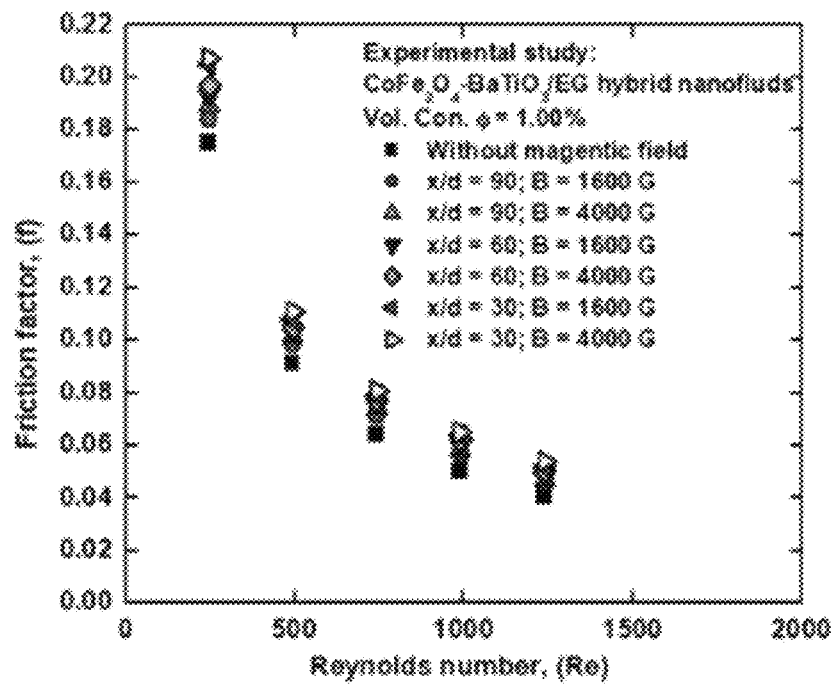

FIG. 10D shows the friction factor of hybrid nanofluids having $\phi$=1.0% vol. at different magnetic fields and at different locations. With an applied magnetic field strength of 4000 G and at a location of x/d of 30, the friction factor was enhanced by 18.29% at a Re of 248.03, compared to without magnetic field. With an applied magnetic field strength of 4000 G and at a location of x/d of 60, the friction factor was enhanced by 12.57% at a Re of 248.03, compared to without magnetic field. With applied magnetic field strength of 4000 G, and at a location of x/d of 90, the friction factor was enhanced by 8% at a Re of 248.03, compared to without magnetic field. At a Reynolds number of 1240.15 with a magnetic field strength of 4000 G and at a location of x/d of 30, 60, and 90, the friction factor was enhanced by 35%, 25%, and 17.50%, compared to without magnetic field.

It has been noted that when the magnetic field is applied to areas close to the inlet section, a higher friction factor is observed compared with areas farther from the inlet. These results are consistent with the literature. The thermal boundary layer is growing at location of x/d of 30, therefore the thickness is thinner and the thermal resistance is lower. This causes the maximum Nu to be attained at this site. As a result, the fluid temperature and tube surface temperature are not equal at this site, and the magnetic field-induced Lorentz force causes a dramatic decrease in surface temperature. As a result, in the location where x/d of 30 lies, a greater local friction factor is obtained.

The obtained friction factor of hybrid nanofluids with and without magnetic field was fitted into a regression form as given in Formula (17) below.

$$f\ a f(Re,\phi,B,x/d) \tag{17}$$

By releasing the proportionality limit in the above equation:

$$f=CRe^a,\phi^b,B^c,(x/d)^d \tag{18}$$

In order to predict the plain base fluid data, $\phi$, B, and x/d were replaced with 1+$\phi$, 1+B, and 1+x/d, then the above equation becomes:

$$f=CRe^a(1+\phi)^b(1+B)^d(1+x/d)^d \tag{19}$$

Through the FOTRAN program, the constants and exponents are obtained and the Formula (19) becomes Formula (20).

$$f = 30.22Re^{-0.8918}(1+\phi)^{0.3323}\left(1+\frac{\vec{B}_{max}}{\vec{B}_{min}}\right)^{05437}(1+x/d)^{-0.06824} \tag{20}$$

248.03<Re<1995.43; 0<$\phi$<1%; 0<x/d<90; $B_{max}$=4000G; $B_m$ in=1600G

Figure 11:
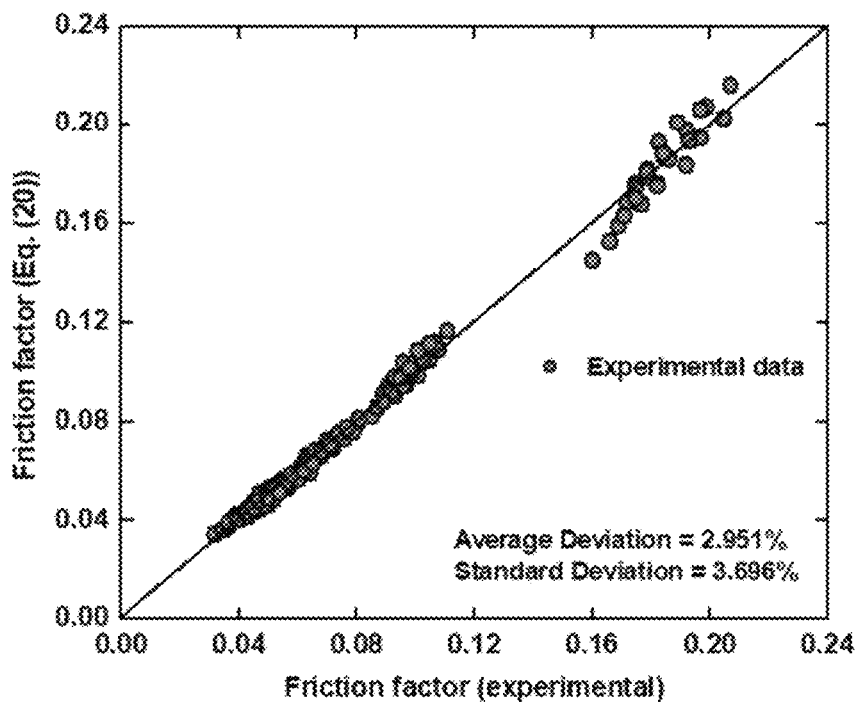
FIG. 11 shows a plot of experimental friction factor versus friction factor calculated with Formula (20).

The values obtained from formula. (20) are shown in FIG. 11 along with experimental data.

Thermal Performance Factor (TPF) analysis

Thermal performance factor was evaluated based on Formula (21) below.

$$TPF = \frac{\left(\frac{Nu_{nf}}{Nu_{bf}}\right)}{\left(\frac{f_{nf}}{f_{bf}}\right)^{1/3}} \tag{21}$$

Figure 12A:
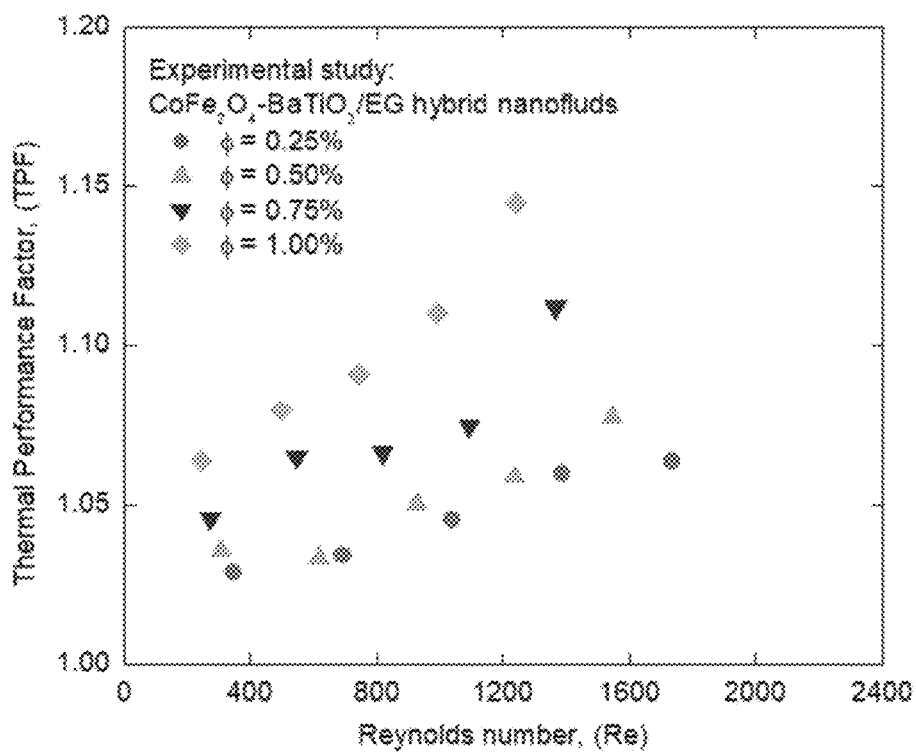
FIG. 12A shows a plot of nanofluid thermal performance factor without magnetic field.
Figure 12B:
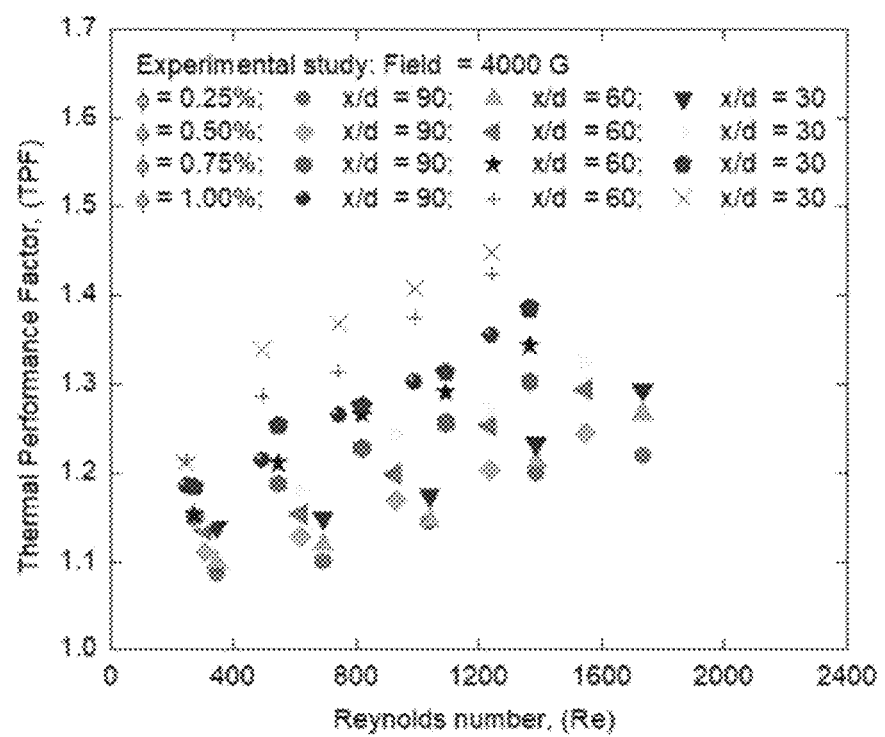
FIG. 12B shows a plot of nanofluid thermal performance factor with magnetic field.

The thermal performance factor of 0.25%, 0.5%, 0.75% and 1.0% vol. of nanofluid fluid was 1.0641, 1.0779, 1.1121, and 1.1447-times higher at a Re of 1733.2, 1545.23, 1365.89, and 1240.15 compared to base fluid without magnetic field (FIG. 12A). Maximum thermal performance factor of 1.354, 1.423, and 1.447-times higher was achieved against the base fluid at locations of x/d of 90, 60, and 30 with applied magnetic field of 4000 G (FIG. 12B).

The thermal conductivity was enhanced by 7.76% and 16.8% at particle loading of 1.0% vol. and at temperatures of 20° C. and 60° C., compared to the base fluid. At 1.0% vol. and at temperatures of 20° C. and 60° C., viscosity was enhanced by 73% and 37.72%, when compared to the base fluid.

The Nusselt number was increased with an increase of Reynolds number and volume loadings. Without applying the magnetic field, the Nusselt number was enhanced by 22.19% at 1.0% vol. of nano fluids and at a Reynolds number of 1240.15 compared to the base fluid. The Nusselt number was further increased with an increase of magnetic field and Reynolds number. For the application of magnetic field at three different locations of x/d of 30, 60 and 90, the Nusselt number increased compared to without magnetic field. The 1.0% vol. loading and with the applied magnetic field of x/d of 30 showed higher Nusselt numbers when compared to x/d of 60 and 90, respectively.

At a magnetic field location of x/d of 30, and the applied magnetic field 4000 G, the Nusselt number was larger. At 1.0% vol. loading and at magnetic field of 4000 G, the Nusselt number was increased by 41.03% at a location of x/d of 30 and at a Re of 1240.15, compared to the same nanofluid without magnetic field.

Compared to the fluid and without magnetic field for 1.0% vol. loading with magnetic field of 4000 G, the Nusselt number was increased by 72.33% at a distance of x/d of 30 and at a Re of 1240.15. The friction factor increased by 21.88% at 1.0% vol. loading without magnetic field and it was further increased by 68.75% with magnetic field of 4000 G compared to the base fluid. The thermal performance factor of 1.0% vol. loading was 1.1447-times higher without magnetic field and it was 1.4477-dmes higher with a magnetic field of 4000 G at a location of x/d of 30 and at a Re of 1240.15.

Numerous modifications and variations of the present invention are possible in light of the above teachings. It is therefore to be understood that, within the scope of the appended claims, the invention may be practiced otherwise than as specifically described herein.

The invention claimed is:

1. A magnetic nanoparticle temperature control method, the method comprising:
    flowing a magnetic nanofluid through a container in contact with an object, wherein the magnetic nanofluid comprises magnetic transition metal ferrite nanoparticles, ferroelectric nanoparticles, and a carrier fluid, the magnetic nanofluid having an initial temperature which is different from the temperature of the object; and
    applying a magnetic field to the magnetic nanofluid while the magnetic nanofluid is within the container in contact with the object,
    wherein the carrier fluid is ethylene; glycol,
    wherein the magnetic transition metal ferrite nanoparticles are $CoFe_2O_4$ nanoparticles having a mean size of 25 to 75 nm,
    wherein the ferroelectric nanoparticles are $BaTiO_3$ nanoparticles having a mean size of 50 to 250 nm,
    wherein the $CoFe_2O_4$ nanoparticles and $BaTiO_3$ nanoparticles are present in the magnetic nanofluid in a ratio of 1:1 to 1:3 by mass,
    wherein the $CoFe_2O_4$ nanoparticles and $BaTiO_3$ nanoparticles are present in the magnetic nanofluid at a mass to volume concentration of 0.5% to 0.75%,
    wherein a Nusselt number of the magnetic nanofluid increases by 7-42.5% when a magnetic field of 4000 G is applied at a Reynolds number of 1200 to 1750 compared to a Nusselt number in the absence of an applied magnetic field.

2. The method of claim 1, wherein the magnetic transition metal ferrite nanoparticles and ferroelectric nanoparticles are present as a composite comprising an aggregate of the magnetic transition metal ferrite nanoparticles and ferroelectric nanoparticles.

3. The method of claim 2, wherein the composite has a saturation magnetization of 25 to 50 emU/g.

4. The method of claim 1, wherein the magnetic nanofluid has a viscosity of 10 to 35 mPa s at 20° C.

5. The method of claim 1, wherein the magnetic nanofluid has a density of 1110 to 1180 kg/m³ at 20° C.

6. The method of claim 1, wherein the magnetic nanofluid has a specific heat of 2250 to 2500 J/kg K at 20° C. and 2575 to 2750 J/kg K at 60° C.

7. The method of claim 1, wherein the magnetic nanofluid has a thermal conductivity of 0.235 to 0.275 W/m K at 20° C. and 0.240 to 0.305 W/m K at 60° C.

8. The method of claim 1, wherein a Nusselt number of the magnetic nanofluid increases by 7.0 to 22.5% when a magnetic field of 4000 G is applied at a Reynolds number of 245 to 350 compared to a Nusselt number in the absence of an applied magnetic field.

9. The method of claim 1, wherein a Nusselt number of the magnetic nanofluid increases by 18.5% to 42.5% when a magnetic field of 4000 G is applied at a Reynolds number of 1200 to 1750 compared to a Nusselt number in the absence of an applied magnetic field.

* * * * *